July 27, 1971 I. N. DULING ET AL 3,595,796
TRACTION DRIVE TRANSMISSION CONTAINING NAPHTHENES,
BRANCHED PARAFFINS, OR BLENDS OF NAPHTHENES AND
BRANCHED PARAFFINS AS LUBRICANTS
Filed Nov. 1, 1967 4 Sheets-Sheet 1

United States Patent Office 3,595,796
Patented July 27, 1971

3,595,796
TRACTION DRIVE TRANSMISSION CONTAINING NAPHTHENES, BRANCHED PARAFFINS, OR BLENDS OF NAPHTHENES AND BRANCHED PARAFFINS AS LUBRICANTS
Irl N. Duling, West Chester, and David S. Gates, Swarthmore, Pa., assignors to Sun Oil Company, Philadelphia, Pa.
Filed Nov. 1, 1967, Ser. No. 679,833
Int. Cl. C09k 3/00; F16h 15/08
U.S. Cl. 252—73                               20 Claims

ABSTRACT OF THE DISCLOSURE

Naphthenes, such as alkyl Decalins, perhydroterphenyls, perhydrofluorenes, perhydrogenated oligomers of styrene, α-methyl styrene, β-methyl styrene and mono- di-, tri- or tetraalkyl or alkyl cyclohexyl substituted derivatives of such naphthenes are useful as lubricants or as components of lubricants for traction drive transmissions. A novel traction fluid having a high traction coefficient and a high viscosity index is obtained by blending selected napthenes with from 0.1–20 parts by weight, based on the naphthene, of a branched paraffin corresponding to hydrogenated liquid $C_3$–$C_8$ olefin polymer, copolymer, or terpolymer. Hydrogenated petroleum oils are also useful as traction fluids or as components of blended traction fluids, as are branched paraffins corresponding to the formula

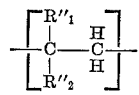

wherein $R''_1$ is hydrogen or methyl, and when $R''_1$ is hydrogen, $R''_2$ is isopropyl or isobutyl, and when $R''_1$ is methyl, $R''_2$ is methyl, ethyl, isopropyl or isobutyl.

CROSS REFERENCES TO RELATED APPLICATIONS

This application is related to Ser. No. 679,834 of Irl N. Duling, David S. Gates, and Marcus W. Haseltine, Jr., entitled "Blending Branched Paraffin Fluids for Use in Traction Drive Transmissions"; Ser. No. 679,801 of Irl N. Duling, David S. Gates, and Robert E. Moore, entitled "Traction Drive Transmission Containing Adamantane Compounds as Lubricant"; and Ser. No. 679,851 of Irl N. Duling, David S. Gates, and Thomas D. Newingham, entitled "Traction Drive Transmission Containing Paraffinic Oil as Lubricant," all filed of even date herewith, and all assigned to the Sun Oil Company.

BACKGROUND OF THE INVENTION

This invention relates generaly to the use of certain naphthenes and branched paraffins as traction fluids. The invention also includes certain novel traction fluids having good low temperature properties comprising a mixture of at least one branched paraffin having a high viscosity index with at least one naphthene having a low viscosity index and a high traction coefficient. Preferably the blend of the paraffin and the naphthene has an average molecular weight in the range of 170–1000, more preferably 220–375. More preferably, the paraffin has a high degree of gem branching and a glass transition temperature in the range of −120 to −50° C. and the naphthene has a glass transition temperature (Tg) in the range of −90 to −30° C.

The invention will be described more particularly in connection with the combination of a power transmission system comprising a traction drive as a lubricant therefor, a composition comprising a hydrocarbon base stock boiling mainly in the lube oil range and having a kinematic viscosity at 210° F. in the range of 1.5–200.0 cs., said base stock comprising at least one hydrocarbon corresponding to a perhydrogenated polymer, copolymer or terpolymer of styrene, α-methyl styrene, β-methyl styrene and alkyl, cyclohexyl and alkyl-cyclohexyl derivatives of said perhydrogenated polymer, copolymers, or terpolymers. For purposes of the present application, the term "hydimer" will sometimes hereinafter be used to refer to fluids containing such a perhydrogenated dimer or codimer of these styrenes.

Fluorine-substituted derivatives of any of the above hydrocarbons, wherein an average of from one to all of the hydrogen of the hydrocarbon is replaced by fluorine are also useful as traction fluids or components thereof, but are too expensive for most applications.

It is to be understood, however, that in addition to the naphthenes and the branched paraffins described hereinafter (or fluorine-substituted derivatives thereof), such a lubricant can also contain other oils and additives such as an antifoam, a phosphorus-containing friction improver, a viscosity index improver (as a high molecular weight polyisobutylene), a pour point depressant (as a fluorine-containing, saturated polymeric olefin), a corrosion inhibitor (e.g., the alkylene glycol-pentaborate salt types), an anti-oxidant and a sludge dispersant. An especially useful additive, combining detergency, corrosion inhibition and friction improvement at high speeds, is a Mg, Ca or Ba salt (especially a super-based salt) of a weak acid or a partial ester of a weak acid, as thiophosphoric acids, phenols, diesters of phosphoric acid, sulfonated alkyl aromatic hydrocarbons and the like (e.g., super-based barium salts of dithiophosphoric acid, calcium alkyl phenates, and calcium salts of mahogany acids). Additives to be avoided in our hydrocarbon base on those containing long, straight or slightly branched alkyl chains and/or highly polar groups, such as $C_{12}$–$C_{20}$ alkyl amines and dibutyl phosphite. In general, suitable additives are those having a "Friction Ratio" at 600 ft./min. (or higher) greater than 0.8 (preferably greater than 0.9). See Rounds, F. G., J. C & E Data, 5, No. 4, 499–507 (1960).

The art has long recognized a need for fluid lubricants having high dynamic coefficients of friction (e.g., greater than those possessed by naphthenic lube oils), and which are non-corrosive and are sufficiently stable to retain these properties under the severe stress to which such fluids are subjected during use.

Such "traction fluids" are important components of variable speed power transmission systems which utilize a traction drive or a friction clutch. In particular, the fluids of the present invention are useful in a traction transmission such as that of the attached drawings (Labelled FIG. 1 and (FIG. 2) and those shown in the following publications and U.S. patents:

| | |
|---|---|
| 1,867,553 | 3,184,990 |
| 2,549,377 | 3,225,617 |
| 2,871,714 | 3,268,041 |
| 3,006,206 | 3,301,364 |
| 3,115,049 | |

Kraus, C. E., ASME—Paper 65—MD–30 (for New York, N.Y. Meeting, May 17–20, 1956).

Hewko, L. O., AIAA Paper 67–429 (for AIAA 3rd Propulsion Joint Specialist Conference, Washington, D.C., July 17–21, 1967).

As has been noted in U.S. Pat. 2,159,220, in the lubrication of continuous automatic variable speed power transmissions employing extremely high pressures between metal surfaces, such as at contact points between balls, rollers, and races, it is essential to avoid the use of a lubricant which will cause slipping between the surfaces at the contact points, thereby preventing the transmission of power through the mechanism. That is, such a lubricant must have a high dynamic coefficient or friction (or "traction coefficient") at elevated temperatures and high pressures. This requirement of a "traction fluid" is diametrically opposed to the requirement for those lubricants employed in ordinary extreme pressure lubrication, for example, in the lubrication of hypoid gears, metal cutting tools, etc., where a low traction coefficient is desired in order to obtain maximum lubrication at points of high pressure.

As has been noted in U.S. 2,549,377, the driving capacity of friction gears is a function of the coefficient of friction between the contacting surfaces and of the pressure which holds them in contact. Unsatisfactory performance of mineral oil, or of fluids containing mineral oil, when used to lubricate and prevent wear in friction gears, has been a key factor in limiting the applications to which friction drive torque converters have been adopted. That is, in the act of lubricating or preventing wear, a film of oil between the friction gear surfaces usually results in an increased slippage between the contact points of the surfaces of the engaging gears. The percent of slip increases drastically and even prohibitively with power input when ordinary high viscosity index mineral lubricating oils are employed.

The traction coefficient, or the dynamic coefficient of friction, which is one measure of the tractive capacity of a contact, can be defined as the ratio of the tangential force to the normal load under rolling-spinning motion. The limiting value of the coefficient of traction is the coefficient of traction at slip, which is observed when the rolling contact is on the verge of gross slip. In a given torque friction drive, coefficient of traction can be computed by knowing the normal load on the contact and by simultaneously measuring the input and output torques.

The essential qualifications of a friction gear transmission fluid comprise especially a high traction coefficient (which an ordinary lubricant does not possess), an extremely high thermal stability and resistance to oxidation so as to minimize the necessity for fluid replacement. Another property which a torque converter fluid must exhibit is minimum sludging. Usually, those fluids which have been found to possess high traction coefficient in reference to steel on steel and also which have satisfactory stability and resistance to oxidation generally have high pour points and low viscosity indexes (VI) (e.g., −50 to −400 ASTM–VI); therefore, most traction fluids are not suitable for use at low temperatures. There is a special need for traction fluids having a high viscosity index, particularly for an ASTM–VI or VTF–VI greater than 40.

Although there is no known means of predicting from structural or other chemical considerations whether a given fluid will be satisfactory for use as a lubricant in a traction drive, a fluid can be tested for an indication of its suitability as a traction fluid by utilizing such equipment and procedures as are described by Almen, J. O., in U.S. 2,045,555 or by Rounds, F. G., Journal of C & E Data, 5, No. 4, pp. 499–507 (1960), and ASLE Transactions, 7, 11–23 (1964). Of particular interest is the research traction test machine of Hewko, L. O., et al., in Proceedings of the Symposium on Rolling Contact Phenomena, pp. 157–185 (1962), Elsevier, Amsterdam, Netherlands.

As is noted in the Hewko paper, the fatigue life of a rolling contact element of a friction drive is inversely proportional to the third power of the load whereas the torque capacity is only directly proportional to the load. As a result, increasing the torque capacity through increasing the coefficient of traction is far more desirable than through increasing the normal load.

A comparatively small difference in traction coefficient can correspond to a large improvement in lubrication. For example, a 10% increase in the traction coefficient of the lubricant will increase the durability of the transmission by about 50%.

The coefficient of traction at a given r.p.m., temperature and contact pressure can vary somewhat depending upon the type of test equipment. Most of the traction fluids reported in the literature as having acceptable fluidity and traction properties are not specific chemical compounds of known purity and good stability. Therefore, it is difficult to reproduce or correlate the work reported by various investigators. A pressing need in this area is a "standard traction fluid" which can be used to correlate traction tests done in various types of transmission and test apparatus.

It has been found that 1,3-(5,7-dimethyl)adamantyl dipelargonate (hereinafter, sometimes DMAP) is especially useful as a standard traction fluid because it is readily prepared in high purity, has excellent stability, and has traction properties which are comparable to those of better naphthenic lube oils of the prior art. In addition, DMAP is more useful than those naphthenic lubes, as a traction fluid or as a component of a traction fluid, for traction drive automatic transmissions because it has fluid properties (such as VI) which are greatly superior to those of the usual naphthenic lube oils.

In general (except for oils having a viscosity at 210° C. below 2 cs.), if a fluid is to be useful as a lubricant for a given type of traction transmission, that fluid must have a traction coefficient in that particular transmission which is at least as high as the traction coefficient which DMAP has in the same transmission at the same test conditions. Therefore, one means of comparing traction fluids is to report their traction coefficients in a particular test (or the average traction coefficient as in FIG. 1) as being X% higher or lower than that of DMAP. The preparation of DMAP is disclosed in copending U.S. application Ser. No. 531,059 now U.S. Pat. No. 3,398,165 of Irl N. Duling and Abraham Schneider, entitled "Diesters Containing Adamantane Nuclei," filed Mar. 2, 1966.

SUMMARY OF THE INVENTION

This invention relates to the use of certain fluids having high traction coefficients as lubricants for traction drive transmissions, and to the resulting novel power transmission systems comprising a traction drive transmission and, as a lubricant therefor, said high traction coefficient fluid. The invention also relates to certain novel hydrocarbon base stocks which are useful as lubricants for a traction drive transmission, particularly for the planetary, ring and cone or friction clutch drive types.

It has been found that fluid $C_{16}$–$C_{40}$ naphthenes containing a di(cyclohexyl)alkane or a hydrindan as a structural nucleus are especially useful as lubricants for friction (traction) drive transmissions, whether the drive is of fixed or variable ratio.

It was further found that an especially useful power transmission system comprises a fixed ratio, roller traction drive of the type described in the aforementioned AIAA paper of Hewko, or a variable ratio drive of the type shown in the attached drawing and labelled FIGS. 1 and 2, and as a lubricant therefor, a composition comprising a hydrocarbon base stock boiling in the lubricating oil range and having an ultraviolet absorbence at 260 millimicrons (260 UVA) below 0.5, said base stock containing, preferably, at least 10 by weight of a $C_{16}$–$C_{27}$ hydrindan. For example, a transmission system comprising the fixed ratio roller traction drive of the Hewko AIAA paper and, as a lubricant, a hydrocarbon base stock containing 45 volume percent of 1,1,3-trimethyl-3-cyclohexyl hydrindan (hereinafter, sometimes DMMCHH), 5 volume percent of 2,5-(dicyclohexyl)-2-methylpentane (hereinafter, sometimes DCHMP), and 50 volume percent of a 5 cs. (at 210° F.) polyisobutylene oil wherein over 33% of the repeating units are of the gem-dimethyl configuration, permits the resulting power transmission system to operate at *double* the torque throughput of the better of the prior art fluids (naphthenic mineral oils) shown in Fig. 3, at page 4, of the Hewko paper.

Additionally, it has been found that fluid $C_{13}$–$C_{40}$ naphthenes containing a spirodecane, spiropentane, perhydrofluorene, perhydrobiphenyl, perhydroterphenyl, decalin, norbornane, perhydroindacene, perhydrohomotetraphthene, perhydroacenaphthene, perhydrophenanthrene, perhydrocrysene, perhydroindane - 1 - spirocyclohexane, perhydrocarylophyllene, pinane, camphane, perhydrophenylnaphthalene or perhydropyrene, as a structural nucleus, are useful as lubricants for traction drive transmissions.

In another novel and very useful embodiment, as is disclosed further hereinafter, it has been discovered that certain adamantane hydrocarbons, and fluoro, ether or ester derivatives of such adamantanes are useful as traction fluids or components of traction fluids. In general, good traction properties appear to be a characteristic of compounds containing the adamantane nucleus or of those naphthenes or alkyl or cycloalkyl naphthenes which are capable of being converted to adamantanes by the Schneider reactions of U.S. 3,128,316 or the reactions of U.S. 3,275,700, 3,336,405, and 3,336,406. However, for the better combination of traction properties, fluidity at 210° F. and low temperature properties, those naphthenes containing the hydrindan, decalin, perhydrophenanthrene, bicyclohexyl, perhydroterphenyl, perhydroacenaphthene, adamantane, or perhydrophenalene nucleus are a preferred group of perhydroaromatics. Fluorinated derivatives of these perhydroaromatics wherein an average of from 1 to all of the hydrogen of the hydrocarbon is replaced by fluorine are also useful as traction fluids or as components of traction fluids.

Generally, those naphthenes having the lower viscosity index (particularly below an ASTM–VI of 0—except where the structural nucleus is phenanthrene or adamantane) will have the higher traction coefficients. These naphthenes can be so used per se, or they can be compounded with additives, such as a dispersant or an antioxidant, or with certain hereinafter described paraffin hydrocarbons in order to alter the fluid properties of the resulting lubricant (which, depending upon the desired end use, can be used as fluid at room temperature as a gas oil or as stiff as a bearing grease).

A preferred embodiment is a power transmission system comprising a traction drive transmission and, as a lubricant therefor, a composition comprising a hydrocarbon base stock boiling mainly above 500° F. and having a kinematic viscosity at 210° F. in the range of 1.5–200.0 (preferably 1.8–20) cs., said base stock comprising a perhydrogenated trimer, dimer or codimer of (1) styrene,
(2) α-methyl styrene,
(3) β-methyl styrene, or
(4) a mono- or dimethyl ring-substtiuted derivative of (1), (2), or (3).

To control fluid loss, it is preferred that the base stock boil no lower than in the gas oil range, more preferably the base stock should boil in the lube oil range. Broadly, the oil should boil mainly about 500° F. and, preferably, mainly above 600° F. and (except in greases) have a 90% point below 950° F. Distillation of such stocks is preferably conducted at reduced pressure (as below 5 mm. Hg) including vacuum-steam distillation, to avoid thermal decomposition.

Normally, our monomer-free perhydrogenated reaction products will contain components boiling mainly in the range of 100–250° C. at 0.5 mm. Hg and the portion chosen for a particular base stock will be obtained by vacuum distillation to recover a fraction of the desired viscosity and flash point. Preferably, the flash point is above 160° F. and more preferably, above 250° F. The viscosity and/or viscosity index of our oils can also be adjusted by "dumbbell" blending, that is, adding controlled amounts of "light (lower boiling) ends and heavy (higher boiling) ends." However, as wil be further disclosed hereinafter, in the case of fluids containing polyolefin oils it is preferred that dumbbell blending be avoided, since it has been found that the better combination of traction coefficient and viscosity index is obtained by choosing a narrow boiling fraction of the desired viscosity, or by blending oils having similar, narrow boiling ranges.

Especially useful components of oils of higher viscosity are the naphthenes corresponding to perhydrogenated trimeric or tetrameric products which are normally present in minor amounts in our perhydrogenated styrene dimerizate but which can be concentrated in the distillation "bottoms" or in fractions boiling mainly above about 615° F. These trimers and tetramers can also be prepared in high yield by further polymerization of the dimerizate prior to perhydrogenation, especially when the dimerizate is polymerized with additional monomer.

The perhydrogenated dimer or codimer, hereinafter sometimes referred to as a hydimer, can preferably consist mainly of a $C_{16}$–$C_{22}$ cyclohexyl hydrindan or mainly of a $C_{12}$–$C_{29}$ di(cyclohexyl)alkane and usually will consist of a mixture of isomers of both such structures. The structural formulae of the above-mentioned naphthenes is as follows:

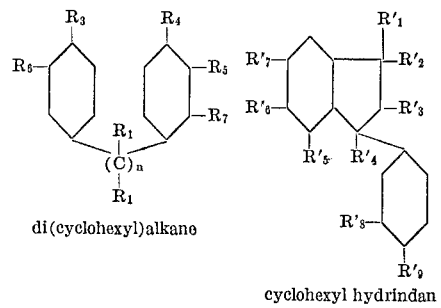

di(cyclohexyl)alkane cyclohexyl hydrindan wherein $n$ is 1–3, $R_1$ and $R_2$ are hydrogen or methyl, $R_3$, $R_4$, $R_5$, $R_6$, and $R_7$ are hydrogen, methyl, ethyl or isopropyl, $R'_1$ is methyl or ethyl and $R'_2$, $R'_3$, $R'_4$, $R'_5$, $R'_6$, $R'_7$, $R'_8$, and $R'_9$ are hydrogen or methyl.

For example, 209 g. (239 ml.) β-methyl styrene can be polymerized with 7 ml. of $H_3PO_4 \cdot BF_3$ to produce a taffy-like reaction mixture boiling mainly from 600–615° F. at 1 atmosphere (120–125° C. at 0.75 mm. Hg) and consisting mainly of a dimer having the structure:

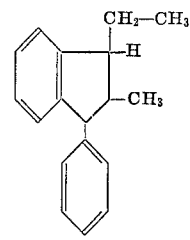

Trimer and tetramer are also found in a fraction (45 g.) boiling in the range of 615–840° F. (125–225° C. at 0.75 mm.).

Such a hydrocarbon base stock having an initial traction coefficient greater than that of DMAP at 600 ft./min., 200° F., 400,000 p.s.i. can also contain (in addition to perhydrogenated dimer, trimer, and tetramer) up to 10 percent of aromatic compounds, such as naphthalenes, phenanthrenes, acenaphthenes, indacenes, hydrindacenes, fluorenes, phenyl indanes, phenylhydrindans and phenylalkyl cyclohexyl compounds. Occasionally such aromatics can be useful since they aid in dissolving certain additives in the fluid. However, to insure against degradation of the traction coefficient under the severe operation conditions encountered in a friction drive transmission, we prefer that the hydrocarbon base stock be substantially free from olefinic and aromatic unsaturation as evidenced by an ultraviolet absorbency at 260 millimicrons (260 UVA) of less than 0.1 and an iodine number less than 2.

When the numerical values reported herein for the traction coefficients of various fluids are compared with the values of other researchers, the values should be adjusted by using the values hereinafter cited for DMAP as the standardization point.

When the hydrocarbon base stock of our invention consists essentially of naphthenes corresponding to perhydrogenated styrene trimers or dimers or alkyl derivatives thereof, the base stock has a low viscosity index, and, therefore, has poor low temperature properties, such as the pour point. It has been found, surprisingly, that novel traction fluids having a traction coefficient at least 10% greater than that of DMAP (at 600 feet per min., 200° F., 400,000 p.s.i.) and having an ASTM viscosity index greater than 40, can be prepared by blending certain branched paraffin hydrocarbons with our perhydrogenated styrene dimer or trimer fluids.

It has been found, surprisingly, that a particularly useful power transmission system comprises a friction drive transmission and, as a lubricant therefor, a hydrocarbon base stock having a 260 UVA below 0.5 and comprising at least one substituted $C_{16}$–$C_{22}$ cyclohexyl hydrindan having the structure

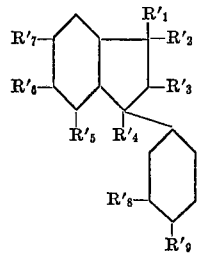

wherein $R'_1$ is methyl or ethyl, and $R'_2$, $R'_3$, $R'_4$, $R'_5$, $R'_6$, $R'_7$, $R'_8$, and $R'_9$ are hydrogen or methyl, said hydrindan being present in an amount of at least 5 percent by weight of the base stock and wherein there is present from 0.1–20 parts by weight, based on said hydrindan, of a branched paraffin corresponding to a fully hydrogenated liquid $C_4$, $C_5$, $C_6$ or $C_7$ olefin polymer, copolymer, or terpolymer. Preferably said olefin comprises isobutylene, 3-methylbutene-1, 4-methylpentene-1, or 2,3-dimethyl-butene-1. More preferably at least 33 percent (most preferably 90–100%) of the repeating units (exclusive of terminal methyl groups) of said olefin polymer have the structure

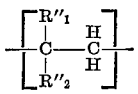

wherein $R''_1$ is hydrogen or methyl, and when $R''_1$ is hydrogen, $R''_2$ is isopropyl or isobutyl, and when $R''_1$ is methyl, $R''_2$ is methyl, ethyl, isopropyl or isobutyl. We also prefer that the average number of branches per molecule be greater than 3 (with the gem configuration considered as two branches).

For example, the olefin polymer can have an average molecular weight from 170–1000 when at least 33 percent, and more preferably at least 50%, of the repeating units of the polymer (exclusive of end groups) have the structure

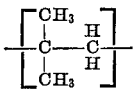

Especially advantageous with such a paraffin, corresponding to a polyisobutylene or to a copolymer or terpolymer of isobutylene with other butenes, is a fluid wherein said hydrindan consists of isomers of 1-methyl, 3-cyclohexylhydrindan, or 1,1,3-trimethyl, 3-cyclohexylhydrindan, or mixtures thereof.

The nuclear magnetic resonance (NMR) spectrum of our most preferred, highly geminally branched paraffin oil will have a greater peak contributed by the crowded methylene group (at about 8.58τ) than the peak contributed by uncrowded methylene groups (at about 8.85τ). See Bartz, K. W., and Chamberlain, N. F., Analytical Chem., 36, No. 11, 2151–8 (1964). Branched paraffin oils having such a high degree of methylene crowding and a lower degree of uncrowded methylene grouping, are not found to any substantial degree in refined naphthenic or paraffinic petroleum oils.

Preferably the novel hydrocarbon base stock, comprising a blend of at least one $C_{16}$–$C_{40}$ naphthene and at least one branched paraffin, has a viscosity in the range of 1.8 to 20.0 cs. at 210° F., a VTF–VI greater than 40, and a traction coefficient at least 10% greater than that of DMAP at 600 feet per minute, 400,000 p.s.i. and 200° F. Of special value is such a hydrocarbon base stock containing from 5–50% by weight of isomers of 1,1,3-trimethyl, 3-cyclohexylhydrindan, and from 1–18 parts of an isobutylene polymer or copolymer per part by weight of hydrindan.

In addition to, or as a substitute for, the branched paraffin, our hydrocarbon base stock can also contain, to improve the viscosity index, from 2–25% by weight of $C_{16}$–$C_{22}$ alkyl hydrindans having the structural formula

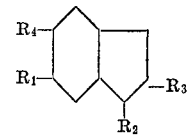

wherein $R_1$, $R_2$, $R_3$ and $R_4$ are selected from hydrogen and the $C_1$ to $C_{12}$ alicyclic paraffins. For example, the following hydrindans can be so used:

| Hydrindan | Boiling pt., °C. at 0.5 mm. | Kinematic viscosity (cs.) at 210° F. | ASTM D2270 VI |
|---|---|---|---|
| 2-n-decylhydrindan | 129 | 2.50 | 149 |
| 5-decylhydrindan | 130 | 2.43 | 150 |
| 2-n-butyl-1-n-hexylhydrindan | 119 | 2.36 | 63 |
| 5-n-butyl-6-n-hexylhydrindan | 119 | 2.18 | 88 |
| 2-n-butyl-5-n-hexylhydrindan | 123 | 2.28 | 131 |

BRIEF DESCRIPTION OF THE DRAWINGS

In the attached drawings

Figures 1, 2:
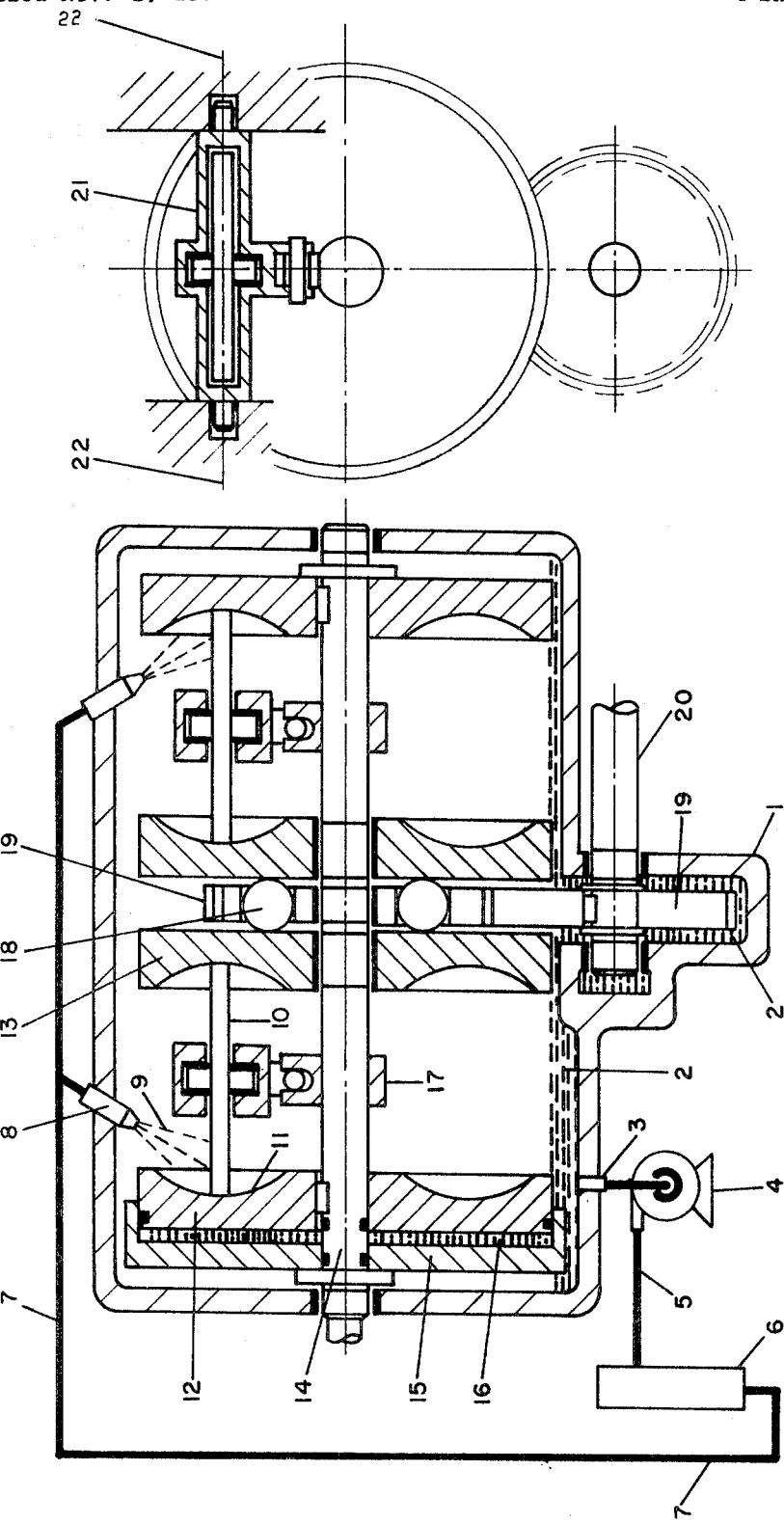
FIGS. 1 and 2 represent, respectively, a side view in cross-section and a partial front view in cross-section of a power transmission system comprising a torric traction drive transmission and, as a lubricant therefor, one of our hydimer traction fluids.

The power transmission system illustrated in FIGS. 1 and 2 is suitable as a continuous automatic variable speed power transmission for automotive use. The torric traction transmission of the figures is similar to that described in Hewko et al., "Tractive Capacity and Efficiency of Rolling Contacts," Proceeding of the Symposium on Rolling Contact Phenomena, Elsevier, Amsterdam, 1962, pp. 159–161. The power transmission system of our invention comprises a torric drive transmission system of our invention comprises a torric drive transmission 1, our traction fluid 2, means, such as a drain 3, a pump 4, and a line 5, to remove said fluid from said transmission and circulate it through a heat exchanger 6 (as an automotive-type radiator), in order that the temperature of the fluid 9 entering the transmission be kept (preferably) below 230° F. (more preferably no higher than 200° F.), the means, such as line 7 and spray nozzle 8, for returning the cooled fluid to the interior of the drive unit.

In operation of the drive unit illustrated in FIGS. 1 and 2, spheroidal steel rollers 10 running on toroidal steel braces 12 and 13 mounted on suitable shafting 14 and 20 are the principal power transmitting components. The toroidal drive in FIGS. 1 and 2 consists of two identical sections transmitting torque in parallel. Each section consists of an input race 13, an output race 12, and three rollers, only one of which 10 can be seen in FIG. 1. Rollers of each section are spaced 120° apart and ⅓ of the input torque is transmitted by each roller. Both input faces 11 are free to rotate on the output shaft 14 whereas both output races 12 are splined to it. Contact load is applied hydraulically by the piston 15 through a hydraulic fluid 16. The double section arrangement makes the thrust force resulting from the contact load self-contained and eliminates having the ground and thrust through a high capacity thrust bearing. In FIG. 1 the surface of the roller which is in contact with the input face is shown as having the same radius of curvature as that of the face. Such a configuration presents a most difficult lubrication problem. Lubrication is greatly facilitated when the radius of curvature of the contact surface of the roller is less than the radius of curvature of the input face (see U.S. 1,867,553).

The cooled traction fluid 9 which acts as a lubricant and coolant for the drive is supplied through one or more spray nozzles 8 which are preferably directed toward the contact area between the steel roller and the race. Circulation of the lubricant throughout the drive unit is accomplished by splash effect. That is, the bottom section of the casing which houses the differential driver gear 19 acts as a sump for fluid which is circulated to the differential ball bearings 18 as the gear rotates.

A change in ratio is accomplished by tilting all rollers about an axis 22 and thus changing the effective radii of the input and output races. Tilting of the rollers can be accomplished by inclining the rollers through some angle about an axis through the race contacts, thus, steering the rollers into the desired ratio position. The ratio between the two sections is kept constant by locking the two synchronizing collars 17 in a position that makes the speeds of both input races identical. The input races are driven through a ball differential 18 by the differential driver gear 19 mounted on the input shaft 20. This arrangement equalizes the torque between the two sections and permits both the input and output shafts to have the same direction of rotation.

It can be seen that an important requirement of a traction fluid for use in such an automotive transmission system is that it not only have good traction properties, but also be a good lubricant for the differential gear and differential ball, and a good lubricant for the rollers and races. Although such a traction fluid could also be used as the hydraulic fluid 16 in the unit, it is preferred that the hydraulic fluid contain an indicator means, such as a distinctive dye, so that leakage of the hydraulic fluid into the main body of the drive unit can be detected by inspection of the main body of traction fluid, such as by a dipstick arrangement.

To prevent loss of fluid by vaporization and to insure against introduction of contaminants into the fluid, the transmission system should be fully enclosed and well sealed. With the more volatile fluids, the seals and system should be capable of withstanding pressure exerted by the vaporized portion of the fluid at operating temperatures.

FURTHER DESCRIPTION OF THE INVENTION

The perhydrogenated oligomers of styrene, α-methyl styrene, β-methyl styrene and mono- and dimethyl ring-substituted derivatives thereof which are useful in the present invention can be obtained by conventional addition polymerization, as by the dimerization of styrene in aqueous sulfuric acid (see Rosen, M. J., J. Org. Chem. 18, 1701 (1953)), followed by high pressure hydrogenation (at least 1000 p.s.i.g., preferably in the range of 2000–10,000 p.s.i. of $H_2$), as with Raney nickel catalyst at 200° C. and 300 p.s.i. of hydrogen. They may also be obtained by polymerization of a vinyl cyclohexane or by hydrogenation of the polymerization product of vinyl cyclohexene or of an alkyl substituted vinyl cyclohexene or by the hydrogenation of the product of the copolymerization of a mixture of vinyl cyclohexenes (including alkyl derivatives thereof), such as by the methods shown in U.S. 2,543,092. Also useful is the hydrogenated vinyl cyclohexene dimer of U.S. 2,590,971.

The conditions of polymerization can be such that the resulting polymer mixture consists primarily of the desired dimer and a minor amount of trimer and other by-products, or the polymerization can be under conditions such that a high molecular weight semisolid or even solid polymer is formed and then the resulting high polymer is depolymerized, as by thermal cracking (preferably at reduced pressure), to an oil consisting of the desired dimer or mixture of dimers and other side products, such as trimers. For example, the oil obtained from the thermal depolymerization, at reduced pressure, of high molecular weight poly(α-methyl styrene) contains a minor amount of a hydrindan type trimer of molecular weight 354 which has the structure

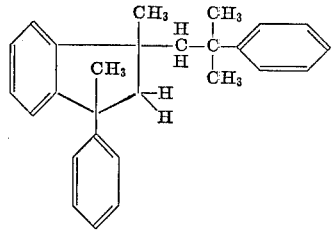

Oils containing major amounts of this trimer can be obtained by distillation of poly(α-methyl styrene) oils containing a fraction boiling in the range of about 625–925° F. Trimers of this structural type are hereinafter sometimes referred to as "hydrindan trimer," and the above trimer, sometimes, as "HTAMS–H" (for hydrogenated trimeric α-methyl styrene containing hydrindan as a structural unit). The other structural forms of polymeric styrenes will hereinafter sometimes be referred to as "poly(alkylcyclohexane)" or, as with the three-unit polymers, "cyclohexane trimer" or "HTAMS" for the hydrogenated trimers of α-methyl styrene which do not contain hydrindan as a structural unit.

When perhydrogenated, this trimer has a viscosity of about 120 cs. at 210° F. and boils at about 230° C. (446° F.) at 0.2 mm. Hg (or about 910° F. at 1 atmosphere) and is useful as a component of our hydrocarbon base stocks where a high viscosity is desired. This trimer is also useful, as is illustrated hereinafter (see Table III) as an additive to increase the average traction coefficient of a hydrocarbon base traction fluid.

A polymerization product containing an even greater proportion of this trimer, and as the second (and major) product, 1,1-dimethyl, 3-methyl, 3-phenylindan, is obtained by the aluminum chloride catalyzed polymerization of α-methyl styrene.

An α-methyl styrene dimerization product which is substantially free of trimer is obtained by the reaction of cumene with ferric chloride. 1,1,3-trimethyl, 3-phenyl-indan is the only major component along with a minor amount of the paraffin form of the "unsaturated terminal" dimer of α-methyl styrene, i.e., 2-(p-cumyl)-2-phenyl propane (a polyalkyl cyclohexane) of the following structure:

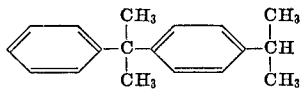

In one embodiment of the invention, our traction fluid can comprise dimers having the di(cyclohexyl) alkane structural nucleus, such as perhydrogenated, 2-(p-cumyl)-2-phenyl propane or 2,5-(dicyclohexyl)-2-methylpentane or naphthenes having dicyclohexane as the structural nucleus, such as naphthenes produced by the process of U.S. 2,249,112. One such naphthene is reported in U.S. 2,249,112 as having the following structural formula:

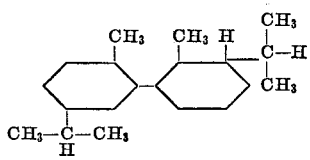

A novel and preferred type of such a hydrocarbon base stock, useful as a lubricant when contained in a traction drive transmission, has a VTF–VI greater than 40 and a traction coefficient greater than that of DMAP, at 600 ft./min./400,000 p.s.i./ 200° F., and comprises a $C_{14}$–$C_{36}$ di (cyclohexyl) alkane or dicyclohexane saving a glass transition temperature below −30° C. and from 0.1–20 parts by weight, based on the total naphthene content of said base stock, of at least one fully hydrogenated, synthetic liquid $C_4$–$C_8$ olefin polymer, copolymer, or terpolymer, said di(cyclohexyl)alkane or dicyclohexane having the structural formula

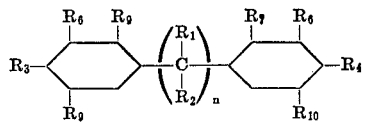

where $n$ is 0–4 and $R_1$–$R_8$ are hydrogen, methyl, ethyl, n-propyl, or isopropyl.

In any event, it is preferred that the final perhydrogenated styrene dimer (hydimer) be as free from aromatic and olefinic unsaturation as economics will permit. Minor amounts of such unsaturates can be removed from such hydrogenated oligomer products by use of an adsorbent, such as silica gel, acid-activated clay, or a crystalline zeolite molecular sieve (e.g., sodium Y zeolite).

In the case of the acid-catalyzed dimerization of the styrenes, such as α-methyl styrene and ring-substituted derivatives of α-methyl styrene, two types of dimers are formed. These are open chain unsaturated dimers of two configurations, "terminal" and "internal" (which upon hydrogenation become di(cyclohexyl)alkanes) and "saturated" dimers, the cyclic-substituted phenyl indanes, (which upon hydrogenation become cyclohexylhydroindans). See, for example, Petropoulos, J. C., et al., JACS 80, 1938 (1958). Note that the resulting dimer, such as 1,3,3-trimethyl-1-phenyl indane (the "unsaturated" dimer of α-methyl styrene) can be a solid at room temperature. However, hydrogenation to the corresponding naphthene, such as the hydrindan, results in a product of substantially lower melting point, and, thus, having better low temperature fluid properties than the unsaturated dimer. These improved low temperature properties can be attributed, perhaps, to the formation an isomeric mixture of naphthenes (that is, a mixture of chair and boat-form cyclohexane rings).

Our preferred perhydrogenated dimer, the cycloalkyl hydrindan, can also be prepared by the Ipatieff-Pines process, for example, as in U.S. 2,514,546 dealing with the production of perhydroindan hydrocarbons. Any of the cycloalkyl perhydroindan hydrocarbons of the aforementioned U.S. 2,514,546 which have a kinematic viscosity at 210° F. in the range of 1.5–200.0 (preferably 3–20 cs.) and boil above 200° C. and below about 500° C., at one atmosphere, can be useful as a lubricant for a friction drive torque converter, particularly when such a hydroindan is a component of a hydrocarbon base stock which also contains a branched paraffin oil which is obtained by hydrogenation of a liquid synthetic $C_4$, $C_5$, $C_6$, or $C_7$ olefin polymer, copolymer, or terpolymer (e.g. polyisobutylene). We prefer that the branched paraffin contain more than three brancheds per molecule. Our hydrocarbon base stock can also comprise mixtures of cycloalkyl perhydroindan hydrocarbons (which can include other alkyl hydroindans), such as those obtained by the hydrogenation of catalytic gas oil fractions boiling mainly above 525° F. or by alkylation of such fractions with $C_2$–$C_{10}$ (preferably $C_3$ and $C_4$) olefin hydrocarbons, followed by hydrogenation.

Di(cyclohexyl)alkanes which are useful as components of the hydrocarbon base stock of our invention can also be prepared by free radical or anionic polymerization of styrenes or by the method of Ipatieff and Pines, as in U.S. 2,622,110. Of particular utility in our invention is 1-(4-methylcyclohexyl)-1-(2-methyl-5-isobutylcyclohexyl)-2-methylpropane ($C_{22}H_{42}$), having the structure

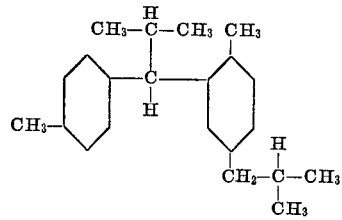

Our hydrocarbon base stock boiling mainly above 500° F. having a viscosity above 3 cs. at 210° F. and comprising a naphthene corresponding to a perhydrogenated dimer or codimer of styrene, α-methyl styrene, β-methyl styrene, or a mono- or dimethyl ring-substituted derivative thereof, is useful as a lubricant for a traction drive transmission due to the high traction coefficient and the good stability of such a hydrocarbon base stock when subjected to prolonged use in such a transmission; however, such a power transmission system is limited to applications wherein temperatures lower than about 0° F. are not encountered, such as in submarines or in naval vessels, or for industrial transmissions which are kept in buildings where the temperature is maintained above about 0° F., and preferably above about 40° F. Such a lubricant can, of course, be used in a transmission which will be exposed to temperatures below 0° C., if the oil is maintained at a higher temperature (as by a heater).

For low temperature use where extremely high fluid pressures are encountered (as in pressure-equalized external submarine transmissions) a fluid of less than 2 cs. at 210° F. and having somewhat lower traction coefficient can be useful. Examples of such low viscosity fluids are oils U, Z, AC, and AD in Table III.

For automatic variable speed traction drive automotive transmissions, where weight, cost and simplicity of assembly assume high importance and where temperatures as low as −40° C. can be encountered, it is preferred that the lubricant used for the automotive transmission have a viscosity of no greater than about 7000 cs. at −20° F. and have a pour point no higher than about −40° F. Therefore, such a fluid must have a high viscosity index (preferably above 40 VTF–VI and more preferably above 75) and have a viscosity at 210° F. in the range of 3–15 cs.

Figure 3:
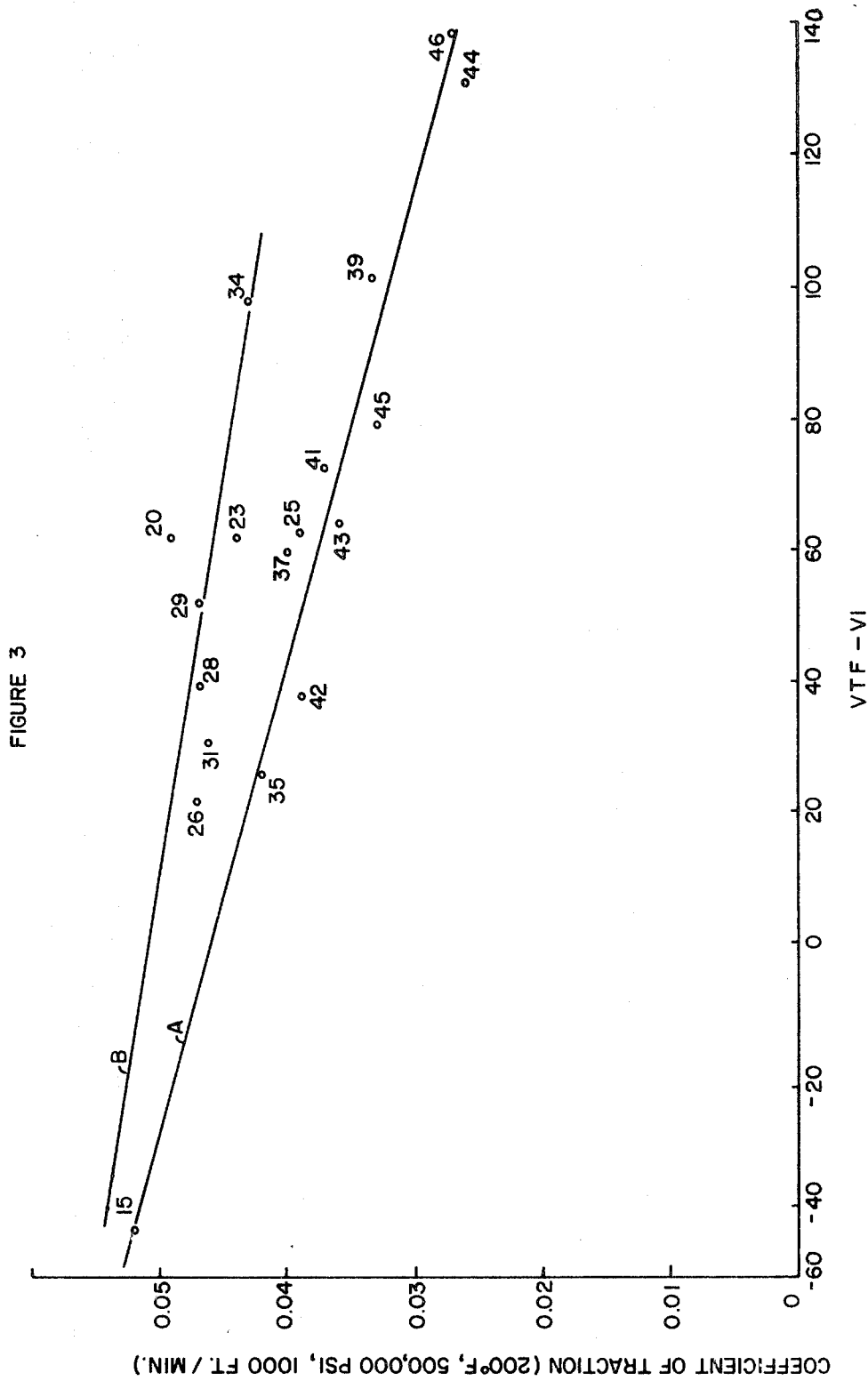
FIGS. 3 and 4 present points representing experimentally determined traction coefficients and viscosity temperature function-viscosity indexes (VTF–VI) of a number of hydrocarbo fluids. The scattering of these points illustrates the unpredictablity, based on chemical composition alone, of the suitability of a particular fluid as a lubricant for a traction transmission. The points and the curves contained on the figures, labelled A and B in FIG. 3 and A' and B' in FIG. 4, illustrate the generality that a fluid having a high coefficient of traction tends to have poor low temperature properties. The curves of the two figures also aid in illustrating our discovery that certain fluids have a higher coefficient of traction than other fluids of about the same VTF–VI.

As is illustrated by the points adjacent to the curve labelled A in FIG. 3, as the viscosity index of an oil increases, its traction coefficient generally decreases. This relationship is particularly striking when the traction coefficient and the VTF–VI of hydrogenated poly-1,3(3-methylbutene-1), oil 31, is compared with hydrogenated poly(1-octene), oil 46, on Curce A in FIG. 3 or Curve A' in FIG. 4.

For an explanation of the viscosity-temperature function (VTF) and the desirability of using the VTF in the determination of the viscosity index of an oil (e.g. the VTF–VI), see Wright, W. A., ASTM Bull. No. 215, July 1956, pp. 84–86 (TP 140–142) and Stearns, R. S., et al., ICEC Product R & D, vol. 5, December 1966, pp. 306–313.

Figure 4:
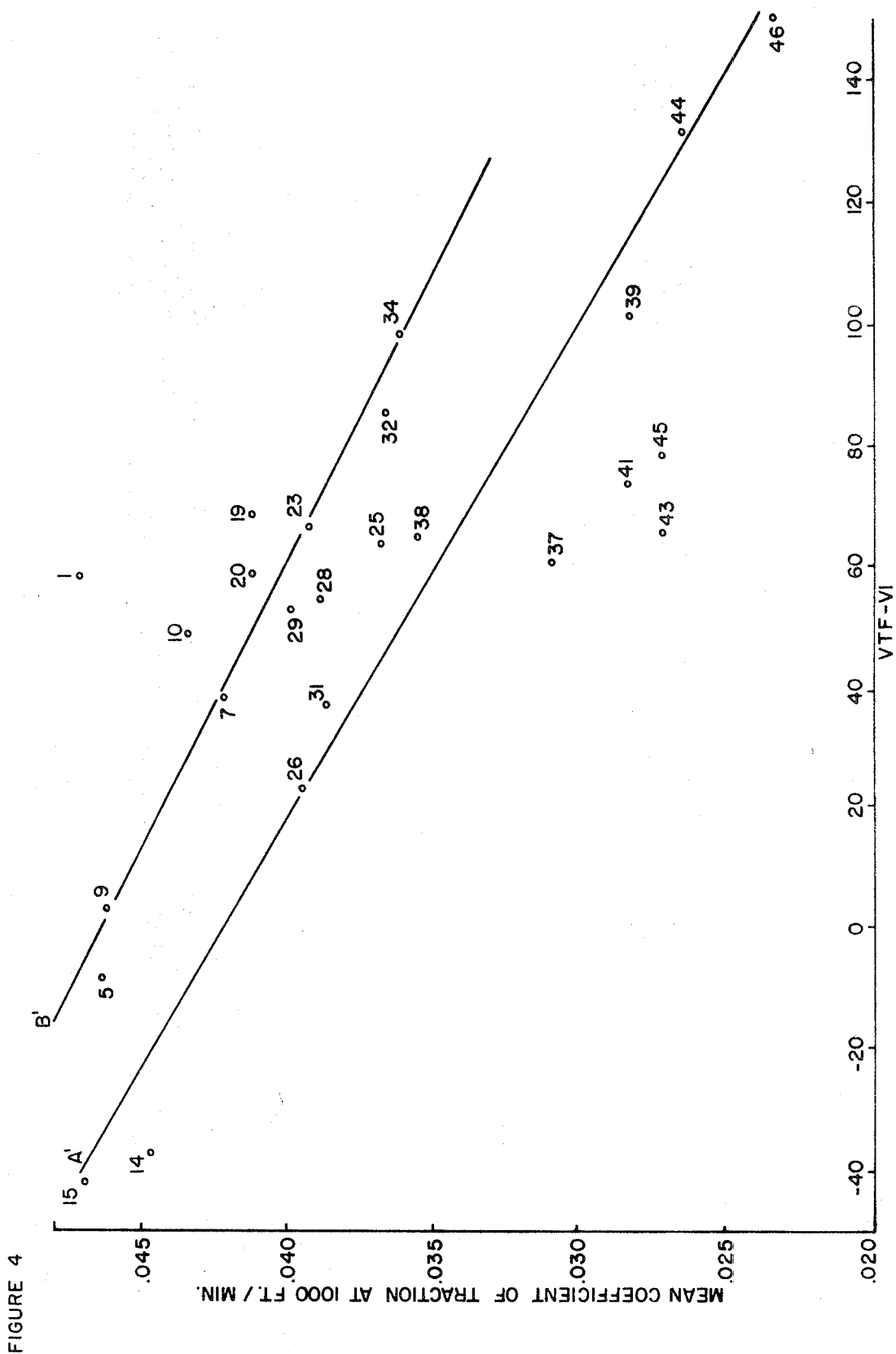

Another relationship is illustrated by the points adjacent or about Curves B and B' of FIGS. 3 and 4 respectively. That is, paraffin oils possessing a high proportion of repeating units having the structural formula

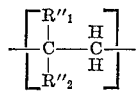

wherein $R''_1$ is hyrogen or methyl and when $R''_1$ is hydrogen, $R'_1$ is i-propyl or i-butyl and when $R''_1$ is methyl, $R''_2$ is methyl, ethyl, isopropyl or isobutyl, have a higher traction coefficient for a given viscostiy index than do the other paraffin oils.

One embodiment of the present invention is a power transmission system comprising a traction drive transmission, and as a lubricant therefor, a composition comprising a hydrocarbon base stock having a kinematic viscosity at 210° F. in the range of 1.8–20.0 cs., said base stock comprising at least one branched paraffin wherein at least 33% of the repeating units of said branched paraffin have the structure

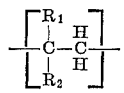

wherein $R_1$ is hydrogen or methyl and $R_2$ is isopropyl or isobutyl. Preferably, the average number of branches per molecule is greater than 3 (with the isopropyl or isobutyl $R_2$ considered as two branches). Such highly branched paraffins are not found to any appreciable extent in refined petroleum oils. Such a power transmission system is particularly advantageous when said branched paraffin has a pour point below 0° C. and an average molecular weight in the range of 188–560. It is preferred that at least 90% of the repeating units, exclusive of terminal groups, of the branched paraffin have said structural configuration. An expecially preferred embodiment of our invention comprises a traction drive transmission and a lubricant comprising at least one such branched paraffin where $R_1$ is hydrogen when $R_2$ is isobutyl, and when $R_1$ is methyl, $R_2$ is isopropyl (see oil 7 and oil 9).

It can also be seen from a comparison of curves A' and B' of FIG. 4 that of the hydimer oils (oils 5 and 14), the oil having the higher proportion of the hydrindan type oligomer (oil 5) tends to have a higher mean coefficient of traction at 1000 feet per second and a higher VTF–VI than does the hydimer oil (oil 14) containing the greater proportion of the di-(cyclohexyl) structure.

Figure 5:
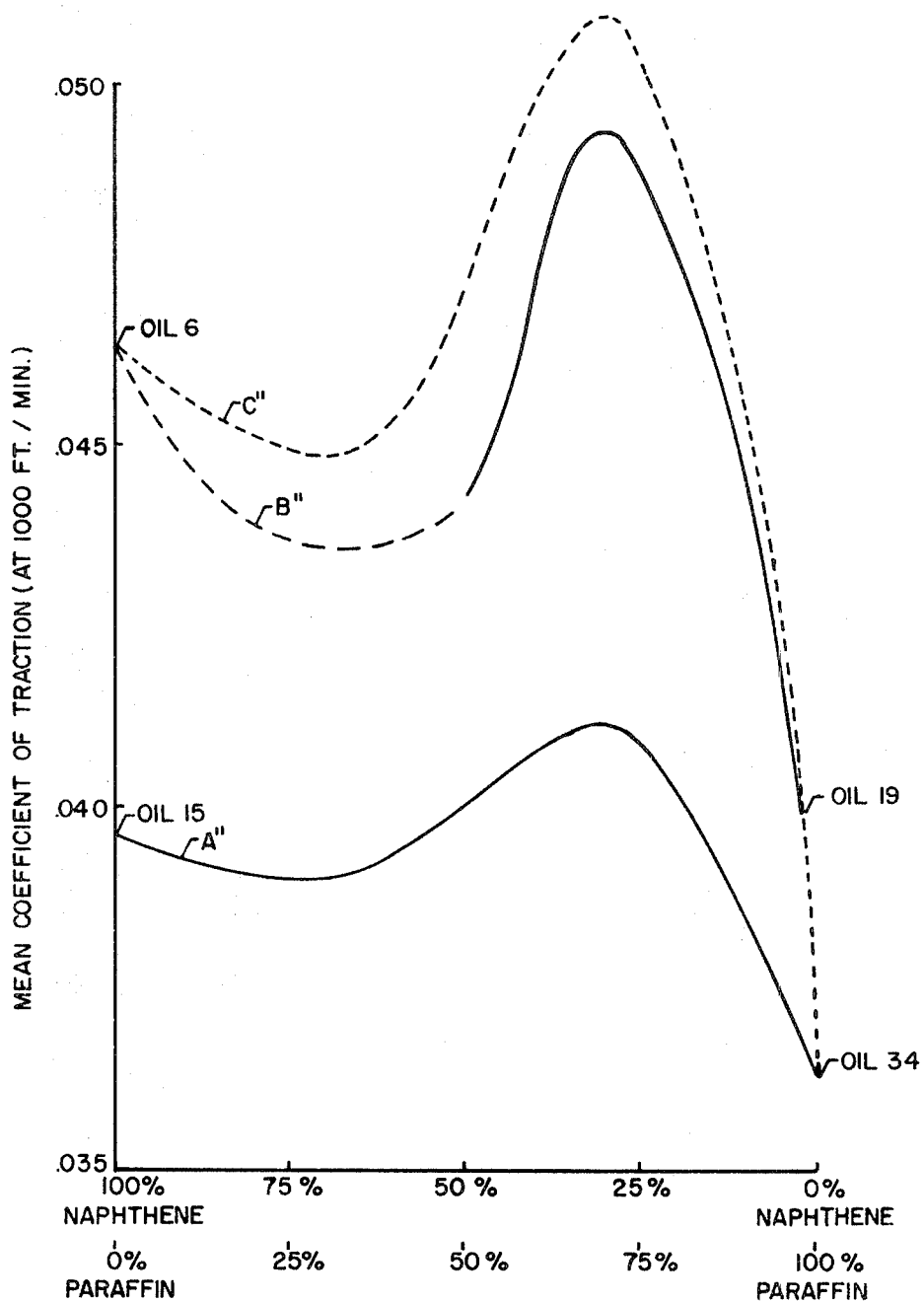
FIG. 5 illustrates the surprising discovery that novel traction fluids can be prepared from blends of naphthene and parafin hydrocarbons wherein the resulting blended fluid has better traction properties than does either of its components.

FIG. 5 illustrates the additional surprising discovery that novel traction fluids can be prepared from blends of naphthene and branched paraffin hydrocarbons wherein the resulting blended fluid has better traction properties than does either of its components. For example, it has been found that oils having a good coefficient of traction and a good viscosity index can be obtained by blending at least one hydimer oil with at least one branched paraffin oil (such as prehydrogenated polyisobutylene) containing a high proportion of repeating units of the aforementioned structural formula

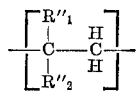

Table I lists the primary structural units found in the oils from which the data points of FIGS. 3, 4 and 5 were obtained, and/or indicates one means of preparing each such oil. Table II lists certain properties of the test oils including their traction coefficient at various conditions when tested by the method of the aforementioned J. C & E Data article by F. G. Rounds. In these traction tests, each oil contained 1% DBCP (dibutyl paracresol) as an antioxidant. The data points of FIG. 4 are an arithmetic average of those traction coefficients obtained at 1000 ft./min. at varied temperatures and contact pressures.

Synthetic liquid $C_3$–$C_8$ olefin polymer, copolymer or terpolymer oils which can be hydrogenated to produce a branched paraffin fluid useful as a component for blending with our naphthene hydrocarbons in order to produce an improved hydrocarbon base for lubrication of traction drive transmissions can be obtained in the manner shown in the following patents and publication: U.S. 3,156,736; 2,993,942; 2,360,446; 2,327,705; 3,007,452; 3,090,822; 2,965,691; 2,224,349; 3,100,808; 1,395,620; 2,500,166; Belgian 663,550; 663,549, Industrial and Engineering Chemistry, Vol. 23, No. 6, pp. 606–7. Note that U.S. 1,395,620 and 2,500,166 teach that, under some polymerization conditions, butenes can be converted to naphthenes. Regarding Decalins, see U.S. 2,203,102.

We prefer, in our blends, that the branched paraffin component have a relatively narrow boiling point (that is, be of fairly uniform molecular weight); we also prefer those oils which have been obtained by hydrogenation of an olefin polymer obtained from Ziegler catalysis (or by thermal cracking of a highly polymerized olefin). Acid catalyzed polymers are our second choice and, as a third choice, free-radical catalyzed polymers. In general, our preferred branched paraffin component is obtained by polymerization of an olefin, such as isobutylene, as with a Ziegler catalyst to form a fairly high molecular weight polymer which is highly viscous, or even a gel, at room temperature. This fairly high polymer is thermally cracked to obtain an oil of the desired viscosity, which is then fully hydrogenated to produce a branched paraffin oil having, in the case of isobutylene, a high degree of geminal disubstitution or "gem branching." Although an equivalent oil can be prepared by polymerization distillation and hydrogenation, a much more uniform product, inasmuch as 33% higher yield, can be obtained by our process involving polymerizing to a higher degree than is ultimately desired and then thermally cracking (especially at reduced pressure) to obtain an oil of the desired viscosity and natural boiling range. Ziegler catalyzed olefin polymerization is shown in U.S. 2,965,691. As an alternative to thermal cracking followed by severe hydrogenation, suitable branched paraffin oils can be obtained by hydrocracking a viscous olefin polymer, as by the process of U.S. 3,084,205.

In the usual polymerization of isobutylene or mixed olefin streams containing isobutylene, butene-1, and butene-2, the polymerization is conducted in an inert solvent using an acid catalyst such as $AlCl_3$ or $BF_3$. The molecular weight of the product is controlled by adjusting the reaction temperature. A high polymerization temperature (20–60° C.) produces polymers having a molecular weight (100–1000) in the lubricating oil range. Polymerization at 0–60° C. yields high polymers of 10,000–1,000,000 molecular weight. Nuclear magnetic resonance spectra and other structural analyses have proven that the high molecular weight polymers are composed of regular repeating isobutylene units connected in a head to tail fashion. That is, the high molecular weight products have a high degree of gem dimethyl repeating units.

However, in the production of oils by high temperature acid polymerization, many side reactions occur which produce branching and even cyclization in the polymer chain. The NMR spectra of such isobutylene oils, having average molecular weights in the range of about 200–1000, will show extra absorption peaks which cannot be produced from the regular, gem dimethyl isobutylene structure. The viscosity index of such high temperature, acid-polymerized polyisobutylene oils is generally about 60 and can be as high as 80. Upon vacuum distillation, narrow boiling fractions of these oils will show lower VI's than the whole oil, that is VI's of —20 to +40.

Although such oils can be used in our traction fluids, we prefer oils which have a higher degree of gem dimethyl branching such as the polyisobutylene oil prepared by the thermal cracking and subsequent hydrogenation of a high molecular weight, low temperature polymerized polyisobutylene which possesses the regular repeating isobutylene structure. The oils prepared by such thermal cracking have different NMR spectra than those prepared by the high temperature polymerization and narrow boiling fractions separated from such thermally cracked oils possess VI's of 90–110.

One embodiment comprises a traction drive transmission and, as a lubricant therefore, a composition comprising a hydrocarbon base stock having a kinematic viscosity at 210° F. in the range of 1.5–200.0 cs., said base stock comprising a fully saturated isobutylene oil having a molecular weight of 200–1000, a pour point less than 0° F., an ASTM–VI greater than 90, which contains no distillate fractions having a VI less than 80 and which, by NMR spectra, has from 60–100% of regular repeating isobutylene units having gem dimethyl structure. In such an oil, the NMR spectrum shows a large peak at about 8.58 tau.

Such thermal cracking or hydrocracking of a regular, high polymer can lead to different oils from those polymerized directly from the monomer. For example, the terminal groups of many of the molecules of the cracked polyolefin oils are different from the usual terminal groups found in olefin oils. Also, as in the case of polyisobutylene, if the high polymer has a high degree of regularity, as with solid isobutylene polymers, the resulting cracked oil will show a greater degree of regularity, particularly as to the positioning of the alkyl branches, than will the usual oil obtained by acid polymerization.

Oils which we have produced by the thermal degradation, at reduced pressure, of highly polymerized, regular isobutylene (that is, polyisobutylene showing a high degree of methylene crowding, as evidenced by the peak at 8.58 tau) can be hydrogenated to produce novel synthetic branched paraffin oils which are especially useful as components of traction fluids. The unexpected, valuable character of the novel polyisobutane oils can be seen by comparing the properties reported for oil D with those reported for oil P in the accompanying Table III. Oil D is a blend of 30% of a perhydrogenated dimerizate of α-methyl styrene and 70% of oil 34 (a highly regular polyisobutylene obtained by thermal cracking); whereas, oil P contains 30% of the same hydimer oil and 70% of oil S, which is an oil similar to oil 19 (that is, an oil obtained by hydrogenation of an oil obtained directly by the acid polymerization of a mixed butylene stream). Oil D, which contains the novel, regular hydrogenated polyisobutylene oil has an average traction coefficient at 1000 ft./min. which is nearly 18% greater than that of oil P, which contains the hydrogenated, mixed polyisobutylene.

The NMR spectrum of oil 34 differs greatly from that of oil 19 (or oil S). That is, oil 34, the hydrogenated, polyisobutylene obtained by cracking, shows a large NMR peak at about 8.58 tau, and almost no NMR peak at 8.84–8.85 tau. As is reported by Bartz and Chamberlain in Analytical Chemistry, 36, No. 11, 2151–2158 (1964), a peak at about 8.58 tau indicates maximum methylene crowding and a peak at 8.84–8.85 tau indicates uncrowded methylene groups associated with a branched chain. In gel or solid polyisobutylene, the high degree of methylene crowding is due to a highly regular polymer having a large number of the repeating polymeric units in the internal geminal methyl form.

In Table III, oil J is a novel oil prepared by blending hydrogenated polyisobutylene oil (oil 34) showing a large peak at 8.58 tau and nearly no peak at 8.84–8.85 tau with oil S, prepared by hydrogenation of an oil produced directly by acid polymerization of a mixed butylene stream, and showing little or no peak at 8.58 tau and a large peak at 8.84–8.85 tau. Such novel blended oils and a traction transmission system containing such oils are another embodiment of the invention, and are especially useful when blended with a hydrogenated petroleum oil with $C_{13}$–$C_{40}$ naphthene.

The polymerization of isobutylene or a mixed olefin stream containing isobutylene in an inert solvent using a Lewis acid catalyst at 20–60° C. also produces polymer oils having a lower VTF–VI than that of an oil of similar viscosity at 210° F. prepared by our process of cracking or hydrocracking a polymer of at least 2000, and preferably above 15,000 molecular weight. For example, compare the viscosity index of oil 19 in Table II (which is a typical polybutene prepared in this manner) with the VI of oil 34, which is a polyisobutylene prepared by our cracking process.

When oil 19 is distilled, the distillation range is relatively broad (470 to 1050+° F.) and considerable quantities of higher boiling (10% over 1040+° F.) and lower boiling fractions are obtained. The VI's of the individual distillate fractions are considerably lower than the VI of the whole oil. This indicates that the viscosity index of oil 19 is the result of the well-known process of dumbbell blending.

Even after hydrogenation, such a wide boiling, mixed polybutylene oil, having a low degree of gem branching, and a VI obtained by dumbbell blending, is not as suitable as a component of a blended paraffin-naphthene traction fluid as is our hydrogenated, cracked polyisobutylene. For example, compare oil 13 (a blend utilizing such a wide-boiling polybutene oil containing a low degree of gem branching) with oil 1 which is a blended oil containing the same proportion of a narrow boiling fraction of a polyisobutylene oil having greater than 90% of gem branching.

Comparison of oil 37, a narrow boiling polypropylene fraction, with oil 45, the broader fraction from which oil 37 was obtained, shows that the narrow boiling fraction had a greatly improved coefficient of traction when compared with the parent oil. For example, oil 37 had a 17% greater traction coefficient at 1000 ft./min., 200° F., and 500,000 p.s.i. than did the parent oil. In our blends of naphthene and branched paraffin hydrocarbons, we prefer that each component and particularly the branched paraffin, be of as narrow a boiling range as is economically or technically feasible.

Another highly regular branched paraffin, useful as a traction fluid or in our blends, can be prepared by hydrogenation of an isobutylene polymer prepared by polymerization of 98–100% isobutylene by the method of U.S. 3,242,158. The average molecular weight of the polymer can be controlled by controlling the polymerization temperature, or a high molecular weight product can be thermally cracked to obtain a lower molecular weight polymer. Another useful polymerization process is that of U.S. 3,166,546.

In order to prepare our paraffin oil having such a high degree of gem dimethyl branching by the thermal cracking of a high molecular weight polyisobutylene, followed by hydrogenation, we prefer that the isobutylene polymer have a Staudinger molecular weight ranging from about 15,000 to about 27,000 (that is, be in the heavy, plastic, sticky semi-solid state); however, our oils may also be prepared by the thermal degradation of more highly polymerized butylene or of lower molecular weight polyisobutylene oils, ranging from about 1000–15,000 molecular weight.

Polypropylene fluids which, upon hydrogenation, can be useful as components of our traction fluids, can be prepared by the acid polymerization of propylene. We prefer, however, to use a more linear and stable polypropylene fluid prepared by means of a Ziegler catalyst. Such oils should be dewaxed, either before or after hydrogenation, in order to remove the stereoregular polypropylene fraction. For example, when the Ziegler catalyst is triethyl aluminum and $TiCl_4$, the resulting polymer can contain as much as 25% of isotactic polymer. This high melting material must be removed so that the fluid has a reasonably low pour point. It was found that a rapid dewaxing procedure for producing a low pour point oil is to dissolve the oil in an equal volume of methyl-ethyl ketone at 50° C. and cool the resulting solution to room temperature. The resulting crystallized wax is in a form which can be rapidly filtered from the oil. The resulting oil is then further diluted with methylethyl ketone (or other dewaxing solvent), cooled to 0° F. and resulting crystals removed by filtration to produce (after solvent removal) a polypropylene oil having a pour point of −5° C. The insoluble wax fractions recovered in the two crystallizations have different properties and are of commercial utility.

Other oils which are useful as traction fluids or as components of traction fluids (particularly as a third component of our perhymer-branched paraffin blends) are obtained by perhydrogenation of the mixtures of as-hydrindacenes and indanyl phenyl alkanes which are obtained when indans are contacted with HF and $BF_3$ in liquid phase at 10–110° C. For example, as is shown in U.S. Ser. No. 388,693 now abandoned of Ronald D. Bushick, filed Aug. 10, 1964, indan can be contacted with HF and $BF_3$ to produce benzene, as-hydrindacene and 1-(2-indanyl) - 3 - phenylpropane as in the following reactions:

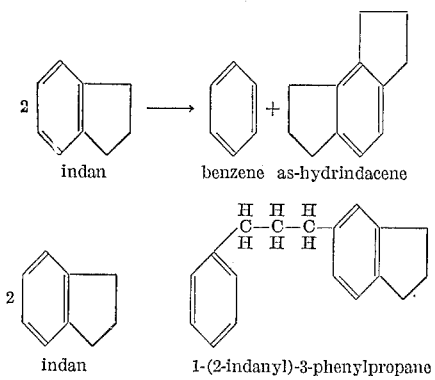

indan     benzene   as-hydrindacene indan     1-(2-indanyl)-3-phenylpropane

Preferably, the lower boiling components (e.g., benzene and unreacted indan) are removed, as by distillation, prior to perhydrogenation. Similarly, a useful component of a blended traction fluid is obtained by perhydrogenation of the reaction mixtures obtained by contacting octahydroanthracene or octahydrophenanthrene in the presence of an acid catalyst, such as $HF \cdot BF_3$ or a crystalline zeolite catalyst, as in the copending application of Ronald D. Bushick, Ser. No. 590,225, filed Oct. 28, 1966 now Pat. 3,396,203.

Also useful as a third component of the naphthene-branched paraffin fluids is from 5–50% of a perhydrogenated poly-1-octene oil having a VTF–VI above 80, preferably above 100.

It is sometimes advantageous to insure that the base stock is free from surface active constituents which can reduce the traction coefficient of the lubricant. One useful method of removing such surface active constituents is that of U.S. 2,897,144, which comprises foaming the oil (or a portion thereof) with a non-reactive gas and separating the resulting foam from the bulk of the oil.

Another embodiment of the invention comprises a traction drive transmission and as a lubricant therefor, a composition comprising a hydrocarbon base stock having a kinematic viscosity at 210° F. in the range of 1.5–200.0 cs., said base stock comprising a $C_{12}$–$C_{30}$ Decalin containing as substituents at least 1 member selected from the group consisting of $C_1$–$C_5$ alkyl, $C_5$–$C_6$ cycloalkyl, and $C_6$–$C_{10}$ alkylcyclohexyl and alkylcyclopentyl. For example, any of the alkylnaphthalenes of U.S. 2,549,377 or U.S. 2,626,242 (including hydrocarbon base fluids which contain such alkylnaphthalenes) can be converted to an alkyl Decalin fluid by severe hydrogenation (at hydrogen pressures greater than 1000 p.s.i., preferably greater than 1500 p.s.i. and more preferably from 3000–10,000 p.s.i.).

The resulting Decalin fluid can contain up to 10% of residual aromatics (by gel) but, preferably, should contain less than 1% of gel aromatics based on the Decalin and have a 260 UVA less than 0.1. Such traction fluids containing Decalins have a better combination of fluid properties and traction properties and have a longer effective life when used in a traction transmission than do the alkylnaphthalene fluids of the aforementioned patents. One such Decalin is tetraisopropyl Decalin (hereinafter somtimes TIDP) the properties of which are reported in Tables I, II, and III herein (see oils 17, 11, 21, G, and AA).

A novel and preferred type of such a hydrocarbon base stock, useful as a lubricant when contained in a traction drive transmission, has a VTF–VI greater than 40 and a traction coefficient greater than that of DMAP at 600 ft./min., 400,000 p.s.i. at 200° F., and comprises such a Decalin having a glass transition below −30° C. and from 0.1–20 parts by weight, based on the total naphthene content of said base stock, of at least 1 fully hydrogenated, synthetic liquid $C_3$–$C_8$ olefin polymer, copolymer, or terpolymer.

An especially useful hydrocarbon base for a traction fluid can be obtained by severe hydrogenation of a refinery stream containing a high percentage of alkylnaphthalenes. Examples of such an alkylnaphthalene-containing refinery stream (and means of concentrating selected fractions) are shown in the following U.S. patents:

| | |
|---|---|
| 3,055,956 | 3,270,074 |
| 3,083,244 | 3,277,199 |
| 3,109,039 | 3,336,411 |
| 3,172,919 | 3,340,316 |

Preferably, the 2,7-dimethylnaphthalene (2,7-DMN) and/or 2,6-dimethylnaphthalene (2,6-DMN) are at least partially removed from the stream (as by crystallization or adsorption on molecular sieve zeolites) prior to hydrogenation of the stream.

Higher boiling, and more viscous, fluids can be obtained from the higher boiling hydrocarbon streams or from such dimethylnaphthalene-containing streams by alkylation of the dimethylnaphthalene stream with a $C_2$–$C_5$ monoolefin (as with $HF \cdot BF_3$ catalyst) prior to hydrogenation. An especially useful hydrocarbon stream for such an alkylation is one containing a high proportion of 2,4-DMN. Residual aromatics can be removed from a hydrogenated refinery stream containing Decalins by means of an adsorbent such as a molecular sieve zeolite or silica gel.

In another embodiment, it was discovered that both the traction properties and fluid properties of the conventional petroleum oils which normally contain from 15–60% gel aromatics or of the usual hydrotreated and/or acid treated and/or solvent treated naphthenic oils (which can contain as little as 5% gel aromatics) can be improved by severe hydrorefining so as to minimize or eliminate the presence of aromatic hydrocarbons in said oils. This embodiment is contrary to the teachings in the art which indicate that hydrogenation has little or no effect on the traction properties of naphthenic oils. For example, see Rounds, F. G., J. C & E Data, vol. 5, No. 4, page 507, wherein it is stated, "Limited attempts to change the friction properties of a naphthenic lube by fractionation and hydrogenation were unsuccessful."

The factor which has not been heretofore appreciated by the art is that although the usual hydrotreating has little or no effect on the traction properties of a naphthenic oil, however, if the hydrogenation is so severe as to virtually eliminate the presence of aromatic hydrocarbons in the resulting hydrogenated oil, the traction properties will be significantly improved (perhaps due to the type of naphthene to which the aromatics are converted). This discovery is illustrated in Tables I, II, and III, by comparing oils 12, 18, 22, 24, 27, 30, 33, 35, 36, 50, 51, I, and AB.

It was also found, for example, compare oil 23 with oil 19, that hydrogenation (to an iodine number less than 2) of a polybutene oil will improve the average traction coefficient somewhat.

For example, oil 36 is a naphthenic distillate, obtained by the process of U.S. 3,184,396, which is hydrorefined, using sulfided nickel molybdenum oxides on alumina catalyst, at 1000 p.s.i. of hydrogen, a fresh feed LHSV (liquid hourly space velocity) of 0.5 and a recycle LHSV of 3.5 to 650° F. Severe hydrogenation of this hydrorefined oil produces oil 27, having a much higher VI and a significantly improved traction coefficient. This severe hydrogenation can be conducted at 3000 p.s.i. of hydrogen, in a bomb, for 6 hours using Raney nickel catalyst (although platinum on alumina gives similar results), followed by adsorption on silica gel to remove residual aromatics (about 1%).

The following table, Table V, illustrates the improvement in traction coefficient and fluid properties imparted by this severe hydrogenation.

TABLE V

| Oil No. | 260 UVA | Traction coefficient * | KV$^{210}$, cs. | VI ASTM | VI VTF | Pour point |
|---|---|---|---|---|---|---|
| 27 | 0.000 | 0.043 | 4.56 | 26 | 45 | −40 |
| 36 | 0.5 | 0.038 | 4.64 | 2 | 10 | −25 |

* 1,000 ft./min., 500,000 p.s.i., 200° F. by method of Rounds, ibid.

Similarly, at 600 ft./min., 400,000 p.s.i., 200° F., the traction coefficient of oil 36 is 0.039 and oil 27 0.048. We prefer that the severely hydrogenated naphthenic oils, when used as a traction fluid or a component of a traction fluid, contain less than 1% of aromatic hydrocarbons (by gel).

One embodiment is a traction drive transmission containing as a lubricant, the composition comprising a hydrocarbon base stock having a kinematic viscosity at 210° F. in the range of 1.5–200.0 cs., said base stock comprising a naphthenic oil containing less than 1% of aromatic hydrocarbons. Preferably, the naphthenic oil should have an ultraviolet absorptivity at 260 millimicrons (260 UVA) of less than 0.05, and more preferably less than 0.005. Typically, such hydrogenated naphthenic oils can have a viscosity at 100° F. of as low as 30 SUS to as much as 10,000 SUS.

Another embodiment comprises a traction drive transmission containing such a fully hydrogenated or saturated naphthenic oil and from 0.1 to 10 parts by weight, based on the naphthenic oil, of at least 1 fully hydrogenated, synthetic liquid $C_3$–$C_8$ olefin polymer, copolymer, or terpolymer. We prefer that the hydrogenated liquid polymeric olefin comprise at least 33% gem dimethyl branching, such as is found in the polybutylene oils. Even more preferable is a polyisobutylene oil having at least 90%, and preferably 100% of gem dimethyl branching (exclusive of end groups).

A comparison of the properties reported in Tables II and III for oil 35 (ASTM oil No. 3, naphthenic lube) and oil 30, which is prepared by severe hydrogenation of oil 35 followed by removal of residual aromatics by absorption on silica gel, shows that the viscosity index of the resulting severely hydrogenated oil is much higher and that the average coefficient of traction is also significantly increased. Also note that the severely hydrogenated naphthenic distillate, oil 27, has a significantly increased coefficient of traction (especially see data at 600 ft./min., 400,000 p.s.i. and 200° F.)—see also oil 22. A major difference in composition between the naphthenic lube, 35, and the naphthenic distillate used to prepare oil 22, is that the naphthenic distillate contains 45% of aromatic hydrocarbons prior to hydrorefining (and had 21% of aromatic carbon atoms, i.e., $C_A$). The amount of residual aromatics removed from the severely hydrogenated distillate by silica gel is very small (less than 1%); therefore, the resulting completely hydrogenated naphthenic distillate contains more than twice the weight of naphthenes (a total of about 70% naphthenic carbon atoms) than is found in the usual hydrorefined naphthenic oil.

In our severely hydrorefined naphthenic oils, at least 15% (preferably over 25%) by weight of the naphthenes contained therein will result from perhydrogenation of the aromatics contained in the oil prior to hydrogenation. Note that oil 35, a naphthenic lube, contains 43% aromatic hydrocarbons and has a 37% $C_N$ and 20% $C_A$; the severely hydrogenated product, oil 30, has a high content of naphthenes corresponding to the perhydrogenated products of these highly condensed aromatic hydrocarbons present in the oil before hydrogenation.

In another embodiment a saturated naphthenic traction fluid is prepared by severe hydrogenation (to less than 1% gel aromatics) of a naphthenic distillate( or an acid refined or solvent refined naphthenic oil) or a hydrorefined naphthenic distillate, containing at least 10% gel aromatic hydrocarbons and having a kinetic viscosity at 210° F. less than 3.0, and preferably less than 2.5 cs. Such fluids are especially useful, due to their low initial viscosity, as traction fluids in external submarine drives. For example, in Table II, oil 50 is obtained by severe hydrorefining of a 50 SUS (at 100° F.) naphthenic distillate containing 40% aromatics, and having a 260 UVA of 5.4.

Such a severely hydrogenated light naphthenic distillate can also be blended with perhydrogenated oligomer oils (such as the perhydrogenated hydrindan-trimer of α-methyl styrene), as is illustrated by oil 51 in Table II. Our severely hydrogenated naphthenic oils can be distinguished from the naphthenic oils of Rounds in J. C & E Data, ibid., in that our oils contain more than 50%, and preferably more than 75% of naphthenic hydrocarbons (by the method of vanNes and vanWestern) and contain less than 2% of aromatic hydrocarbons.

In another embodiment the severely hydrogenated naphthenic oil (having a viscosity in the range of 30–10,000 SUS at 100° F.), containing more than 50% of naphthenic hydrocarbons and less than 1% of aromatic hydrocarbons, is blended with from 0.1–10 parts by weight, based on the perhydrogenated naphthenic oil, of at least 1 fully hydrogenated, synthetic liquid polymer, copolymer, or terpolymer of $C_4$–$C_7$ olefin. We especially prefer that the branched paraffin oil be a polyisobutylene having a high proportion of its structural repeating units of the gem dimethyl branching, according to the structural formula

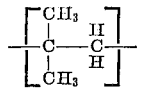

Such an oil will, preferably, have a large NMR peak at about 8.58 tau.

Another embodiment relates to novel blended fluids and utilizes the discovery that the traction properties of branched paraffin oils containing a low degree of gem dimethyl (branching, or having a large NMR peak at about 8.84–8.85 tau), can be improved by incorporating therein a fully hydrogenated liquid polymer of isobutylene wherein a large proportion of the repeating units of said isobutylene polymer have gem dimethyl branching (as evidenced by a large NMR peak at about 8.58 tau). Such blended oils can advantageously be blended with from 0.1–10 parts by weight of severely hydrogenated naphthenic distillates, in the formulation of a traction fluid.

Other embodiments involve the discovery that fluid $C_{18}$–$C_{40}$ naphthenes containing a perhydroterphenyl, or fluid $C_{13}$–$C_{25}$ naphthenes containing perhydrofluorene as a structural nucleus, are useful as lubricants for traction drive transmissions, whether the drive is of a fixed or variable ratio.

The perhydrogenated terphenyl and fluorene compounds which are useful in the present invention can be obtained by conventional synthesis as by the hydrogenation of terphenyls, fluorene or substituted fluorenes or terphenyls, or partially hydrogenated derivatives thereof, as with Raney nickel catalyst at 200° C. and 3000 p.s.i. of hydrogen. The substituted fluorene derivative can be in relatively pure form, or can be present in concentrations as low as 10% in distillate fractions from petroleum refining or petrochemical manufacture.

One embodiment is an especially useful power transmission system comprising a fixed ratio, roller traction drive of the type described in the aforementioned AIAA paper of Hewko, or a variable ratio drive of the type shown in the attached drawings labeled FIGS. 1 and 2, and as a lubricant therefor, a composition comprising a hydrocarbon base stock boiling in the lubricating oil range, having a viscosity at 210° F. in the range of 2.0–12.0 cs., and having an ultraviolet absorbance of 260 mM. (260 UVA) below 0.5 (preferably below 0.1), said base stock containing at least 5% preferably at least 10 percent, by weight of a $C_{18}$–$C_{26}$ perhydroterphenyl or a $C_{13}$–$C_{25}$ perhydrofluorene. For example, a transmission comprising the fixed ratio roller traction drive of the Hewko AIAA paper, and as a lubricant, a hydrocarbon base stock containing 10 volume percent of perhydrofluorene and 90 volume percent of a 5 cs. (at 210° F.) polyisobutylene oil wherein over 33 percent of the repeating units are of the gem-dimethyl configuration, permits the resulting power transmission system to operate at a higher torque throughput than with the better of the naphthenic mineral oils shown in FIG. 3, at page 4, of the Hewko paper.

A preferred embodiment is a power transmission system comprising a friction drive transmission, and as a lubricant therefor, a composition comprising a hydrocarbon base stock boiling mainly above 500° F. and having a kinematic viscosity at 210° F. in the range of 1.5–200.0 (preferably 1.8–20) cs., said base stock comprising perhydrogenated orthoterphenyl or perhydrofluorene or a saturated, $C_{19}$–$C_{40}$ hydrocarbon substituted derivative of terphenyl or a hydrocarbon substituted derivative of perhydrogenated fluorene wherein said hydrocarbon substituent is selected from the group consisting of alkyl, cycloalkyl, and alkylcycloalkyl.

Perhydrofluorene (having an ASTM–VI of 105, a $KV_{210}$ of 2.5 cs. and a pour point less than 0° C.) and $C_{17}$–$C_{23}$ alkyl substituted derivatives thereof (e.g., the dimethyl derivatives) are also useful as components of traction fluids, as are perhydroacenaphthalenes. Preferred perhydrogenated acenaphthalene and fluorene derivatives can be obtained by perhydrogenation of the following fluorene compounds (or hydro-derivatives thereof):

1-(5-acenaphthyl)-butane
1-(5-acenaphthyl)-hexane
9-methylfluorene
9-(4-methyl-benzylidene)-fluorene
9-phenyl-fluorene
1,8-dimethyl-9-(2-tolyl)-fluorene
9-benzylidene-fluorene Preferred perhydrogenated terphenyl derivatives can be obtained by perhydrogenation of orthoterphenyl (or hydro-o-terphenyls) or $C_{19}$–$C_{24}$ methyl substituted-o-terphenyls or by hydrogenation of hydrocarbon streams containing at least 5% of o-terphenyl.

To control fluid loss, it is preferred that the base stock boil no lower than in the gas oil range, more preferably the base stock should boil in the lube oil range. Where the base stock boils mainly below the gas oil range, the fabrication of a transmission utilizing such a stock as a lubricant becomes costly because tolerances become critical and the seals must be very tight in order that there is no undue loss of the fluid through vaporization. Such highly volatile fluids, however, can be quite useful as lubricants when the transmission is properly designed so as to prevent fluid loss by vaporization and when the pressure-volume-temperature relationship within the transmission is such that a substantial portion of the fluid remains in liquid phase during the operation of the transmission.

Broadly, the oil should boil mainly above 500° F. and preferably, mainly above 600° F. and (except in greases) have a 90% point below 950° F. Distillation of such stock is preferably conducted at reduced pressure, including vacuum-steam distillation (as under 5 mm. Hg) to avoid thermal decomposition.

Normally, our monomer-free perhydrogenated terphenyl and fluorene compounds will be produced from distillate fractions obtainable in a petroleum refinery, such as the recycle from catalytic cracking or the recycle from thermal demethylation of alkyl aromatic hydrocarbons. Satisfactory traction fluids can be compounded from such perhydrogenated distillate fractions, when the distillate fraction contains at least 5% (preferably at least 15%) of terphenyl, fluorene, hydrofluorene, or hydroterphenyl compounds.

When the hydrocarbon base stock consists essentially of naphthenes corresponding to perhydrogenated terphenyl or fluorene or alkyl and cycloalkyl derivatives thereof, the base stock has a low viscosity index, and therefore, has poor low temperature properties, such as the pour point. We have discovered that novel traction fluids having a traction coefficient at least 10% greater than that of DMAP (at 600 ft./min., 200° F., 400,000 p.s.i.) and having an ASTM–VI greater than 40, can be prepared by blending from 1–20 parts by weight of fluid, branched paraffin hydrocarbons containing an average of over 3 branches per chain, with fluid $C_{18}$–$C_{40}$ naphthenes containing perhydroterphenyl or perhydrofluorene as a structural nucleus.

It has been discovered, surprisingly, that a particularly useful power transmission system comprises a friction drive transmission and, as a lubricant therefor, a substantially saturated hydrocarbon base stock having a 260 UVA below 0.5 and comprising at least one member selected from the class consisting of perhydro-ortho terphenyl, $C_{18}$–$C_{40}$ hydrocarbon substituted derivatives of terphenyls, perhydrofluorene and the $C_{14}$–$C_{25}$ hydrocarbon substituted derivatives of perhydrofluorene, the perhydroterphenyl or perhydrofluorene compound being present in an amount of at least 5% by weight of the base stock, and wherein there is present from 0.1–20 parts by weight, based on said perhydrofluorene, of a fully hydrogenated, liquid $C_3$, $C_4$, $C_5$, $C_6$, $C_7$, or $C_8$ olefin polymer, copolymer, or terpolymer. Preferably said olefin comprises isobutylene, 3-methylbutene-1, 4-methylpentene-1, or 2,3-dimethylbutene-1. More preferably at least 35% (most preferably 90–100%) of the repeating units (exclusive of terminal methyl groups) of said olefin polymer have the structure

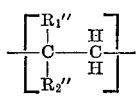

wherein $R''_1$ is hydrogen or methyl, and when $R''_1$ is hydrogen, $R''_2$ is isopropyl or isobutyl, and when $R''_1$ is methyl, $R''_2$ is methyl, ethyl, isopropyl, or isobutyl.

Another embodiment is a power transmission system comprising a traction drive transmission and, as a lubricant therefor, a hydrocarbon base stock having a kinematic viscosity at 210° F. in the range of 1.5–200.0 cs., said base stock comprising a paraffinic oil containing less than 1% by weight of aromatics having an ultraviolet absorptivity at 260 millimicrons of less than 0.5. We prefer that the paraffinic oil be obtained by severe hydrogenation of a petroleum oil having a percent $C_P$ greater than 60, a percent $C_N$ greater than 30, and a percent $C_A$ greater than 2. The paraffinic oil, preferably, has an ASTM–VI greater than 80, a refractive index at 68° F. greater than 1.47 and an SUS viscosity at 100° F. in the range of 60–3000.

In another embodiment, the base stock contains from 5–75% of a $C_{13}$–$C_{40}$ naphthene having a glass transition temperature in the range of $-90$ to $-30°$ C. and containing, as a structural nucleus, a cyclohexyl hydrindan, di(cyclohexyl)-alkane, spirodecane, spiropentane, perhydrofluorene, perhydrobiphenyl, perhydroterphenyl, Decalin, norbornane, perhydroindacene, perhydrohomotetrapathene, perhydroacenaphthene, perhydrophenanthrene, perhydrocrysene, perhydroindane-1-spirocyclohexane, perhydrocarylophyllene, pinane, camphane, perhydrophenylnaphthalene, perhydropyrene, or adamantane. Although the conventional paraffinic and naphthenic petroleum oils contain minor amounts of individual members of some or all of the above types of naphthene, it is very rare to encounter more than 5% of any individual class in a given petroleum lubricating oil. Therefore, a given paraffinic oil, of the type useful in our invention, should be analyzed to determine its content of some or all of the aforementioned classes of naphthene and, at least one member of at least one of the above classes of naphthene should be added to the paraffin oil in sufficient quantity to increase the traction coefficient thereof. Preferably the average traction coefficient at 1000 ft./min. should be increased at least 10% by means of such addition of naphthenes.

Especially preferred naphthenes for such blending are those naphthenes corresponding to a perhydrogenated polymer, copolymer, or terpolymer of any of the following monomers:

(1) styrene,
(2) α-methyl styrene,
(3) β-methyl styrene,
(4) a mono- or dimethyl ring-substituted derivative of (1), (2), or (3).

Another embodiment comprises a transmission system containing a paraffinic oil and from 1–10 parts by weight, based on the paraffinic oil, of a fully hydrogenated liquid polymer, copolymer, or terpolymer of $C_3$–$C_8$ olefin.

Another class of component which is useful in blending with such paraffin oils, and such paraffin oils containing our preferred naphthenes or our upreferred branched paraffin, is a severely hydrorefined naphthenic lube containing less than 1% of aromatic hydrocarbons and having a viscosity in the range of 30–10,000 SUS at 100° F.

Oil I of Table III illustrates the advantages of one embodiment of our invention, namely, a hydrocarbon base stock having a kinematic viscosity at 210° F. in the range of 1.5–200.0 cs., and comprising a paraffinic oil containing less than 1% by weight of aromatics and having a 260 UVA of less than 0.5 and containing from 5–75% of a naphthene corresponding to a perhydrogenated polymer, copolymer, or terpolymer of (1) styrene, (2) α-methyl styrene, (3) β-methyl styrene, and (4) a mono- or dimethyl ring-substituted derivative of 1, 2, or 3.

In another embodiment, a preferred component of a blended traction fluid, which can be a fluid containing a paraffinic oil containing less than 1% by weight of aromatics, is a saturated, synthetic branched paraffin oil obtained by blending a fully hydrogenated liquid polymer of isobutylene having a sufficiently high degree of gem-dimethyl branching to produce a large NMR peak at about $8.58\tau$, and a branched synthetic paraffin oil containing a low degree of gem-dimethyl branching (as evidenced by a small NMR peak at about $8.58\tau$), and having a sufficiently large proportion of uncrowded methylene groups so as to produce a large NMR peak at about $8.84$–$8.85\tau$. An illustration of such an oil is Oil J of Table III, having a VTF–VI of 83 and an average traction coefficient of 0.044 (at 1000 ft./min.). Preferably, such a branched paraffin oil, containing paraffins having a high degree of methylene crowding and a low degree of methylene crowding, will have an average molecular weight in the range of 170–1000. Such a blended synthetic paraffin oil can also be advantageously blended, in the compounding of a traction fluid, with from 1–10 parts by weight, based on the blended branched paraffin, of at least 1 other branched paraffin corresponding to a fully hydrogenated polymer, copolymer, or terpolymer of $C_3$–$C_8$ olefin. Preferred branched paraffins in such blends correspond to fully hydrogenated polymers of propylene, 3-methylbutene-1, 4-methylpentene-1, 2,3-dimethylbutene-1, 1-hexene, or 1-octene, or a copolymer of propylene and ethylene. Also useful as a traction fluid is a hydrocarbon base stock containing a blend of at least 2 branched paraffin oils, and preferably a blend of at least 1 branched paraffin oil having an NMR spectrum showing a large peak at 8.58 with another branched paraffin oil showing a large NMR peak in the area of $8.84$–$8.85\tau$, and from 5–75% of a $C_{13}$–$C_{40}$ naphthene having a glass transition temperature in the range of $-90$ to $-30°$ C. and containing, as a structural nucleus, a cyclohexyl hydrindan, di(cyclohexyl)alkane, spirodecane, spiropentane, perhydrofluorene, perhydrobiphenyl, perhydroterphenyl, Decalin, norbornane, perhydroindacene, perhydrohomotetraphthene, perhydroacenaphthene, perhydrophenanthrene, perhydrocrysene, perhydroindane - 1 - spirocyclohexane, perhydrocarylophyllene, pinane, camphane, perhydrophenylnaphthalene, perhydropyrene, or adamantane.

Another embodiment is a power transmission system comprising a friction drive transmission and, as a lubricant therefor, a composition comprising a hydrocarbon base stock having a kinematic viscosity at 210° F. in the range of 1.5–200.0 cs., said base stock comprising at least one $C_{12}$–$C_{40}$, saturated adamantane compound, said adamantane compound containing no elements other than carbon, hydrogen, fluorine, and oxygen. Oxygen in such adamantane compounds must be combined in an ether or an ester linkage.

Our preferred saturated adamantane compounds are as follows:

Alkoxy derivatives of alkyl adamantanes (e.g. methoxy),
Perhydrogenated derivatives of benzoxy adamantanes,
Diesters containing either 1 or 2 adamantane nuclei,
Alkyl derivatives of the members of the above-listed groups wherein the alkyl group contains from 1–10 carbon atoms,
Cycloalkyl derivatives of the above-noted groups, wherein the cycloalkyl group is cyclopentane, cyclohexane, or a mono- or dimethyl derivative of cyclopentane or cyclohexane,
A dicycloalkyl derivative of adamantane wherein the dicycloalkyl group is dicyclohexane, di(cyclohexyl) propane, or a mono-, di-, or tetramethyl derivative thereof,
An alkyl derivative of adamantane, preferably wherein the alkyl group contains from 1–10 carbon atoms, Adamantane containing as substituents both alkyl and cycloalkyl groups, wherein the alkyl group contains from 1–10 carbon atoms and the cycloalkyl group is cyclopentane, cyclohexane or an alkyl derivative thereof.

Fluorine-substituted derivatives of any of the above-referred to saturated adamantane compounds.

Examples of our preferred saturated adamantane compounds are perhydro-1-benzoxy adamantane (prepared by perhydrogenation of 1-benzoxy adamantane, using Raney nickel catalyst at 200° C. and 3000 p.s.i. of $H_2$), and the mono-esters of 1-adamantane carboxylic acid which are described by Spengler et al., Erdöl- und Kohle-Erdgas-Petrochemie, Vol. 15, pages 702–707 (September 1960).

The diesters described in U.S. application Ser. No. 531,059 of Irl N. Duling and Abraham Schneider, filed Mar. 2, 1966, now Pat. No. 3,398,165, are especially useful. These diesters comprise two types as follows:

(I) Diesters of alkyl-substituted adamantane 1,3-diols with alkanoic or cycloalkanoic acids.
(II) Diesters of alkyl-substituted adamantane 1-monools with alkane dioic or cycloalkane dioic acids.

Also useful are products obtained by alkylating adamantane hydrocarbons of the $C_{10}$–$C_{30}$ range having 1–4 open bridgehead positions. For example, the products obtained by the alkylation reaction of U.S. Ser. No. 613,443 of Abraham Schneider, filed Feb. 2, 1967, and now Pat. No. 3,382,288.

Fluoro and perfluoro derivatives of any of the above adamantane compounds, such as are obtained by passing the adamantane compound in vapor phase over a bed of $CoF_3$ in a tubular reactor maintained at about 350° C., are also useful as traction fluids.

Especially preferred adamantane compounds are dimethylbutyladamantane,
dimethyloctyladamantane,
dimethylcyclopentyladamantane,
dimethylcyclohexyladamantane,
dicyclohexylethyladamantane,
dimethyladamantanedipelargonate, and
dimethyladamantanedicaproiate, wherein all of the substituents on the adamantane are at bridgehead positions.

Another preferred embodiment is a hydrocarbon base stock, useful as a traction fluid, comprising a mixture of substituted adamantanes derived by contacting a petroleum hydrocarbon stream which is substantially free from aromatic or olefinic unsaturation and which contains at least one perhydroaromatic hydrocarbon having three rings and at least 12 carbon atoms at a temperature in the range of −5 to +50° C. with an aluminum halide catalyst, and continuing such contact until at least a substantial proportion of the perhydroaromatic has been converted to hydrocarbon product having adamantane structure. The adamantanes so produced can be further converted by alkylation, as by the method of the aforementioned Schneider patent application.

Certain embodiments are illustrated by oils H, U, W, AC, and AD of Table III. Oil H, a dimethyladamantane dicaproiate, has an average traction coefficient which is almost 20% greater than that of dimethyladamantanedipelargonate (DMAP) and which is more than 50% greater than the average traction coefficient of dimethyladamantane (oil AD). This indicates that the alkyl and dialkyl derivatives of adamantyl dicaproiates are especially useful as traction fluids or as components of traction fluids. Oil U, cyclopentyl dimethyladamantane, has an average traction coefficient which is only slightly higher than that of DMAP; however, it has a very high VTF–VI (107) and a low kinematic viscosity at 210° F. (1.7 cs.). This indicates that cyclopentyl derivatives of alkyl adamantanes are an especially useful class of materials for use as traction fluids and as components of traction fluids. In particular, cyclopentyl dimethyladamantane, due to its low viscosity and high viscosity index, is useful as a traction fluid or a component of a traction fluid which will be subjected to high hydraulic pressure and/or low temperature during use.

One such blended traction fluid comprises perhydrophenanthrene, and from 0.1–10 parts, based on the perhydrophenanthrene, of cyclopentyldimethyladamantane.

Due to the high cost of the adamantane compounds, it is only in highly specialized applications where economics will permit their use, per se, as traction fluids. However, due to their high coefficient of traction, compared with their viscosity index, the adamantanes are especially useful components for blending with other naphthenes, with branched paraffins, and with hydrogenated naphthenic or paraffinic petroleum oils in the compounding of traction fluids. Another adamantane compound which is useful as a traction fluid or as a component of a blended traction fluid, is obtained by perhydrogenation of benzyladamantal ether, which can be obtained by the method in J. Org. Chem., Vol. 27, page 1933 (June 1964).

Although there have been disclosed previously herein many processes which can be used to prepare the naphthenes and branched paraffins useful in the present invention, the following examples are presented to illustrate certain means which can be used to obtain oils which are useful as traction fluids and as components of blended traction fluids.

Example I shows the preparation of a polymerizate of α-methyl styrene containing a large proportion of 1,3,3-trimethyl-1-phenylindane and a lesser proportion of trimers and the unsaturated α-methyl styrene dimer.

Example II shows the hydrogenation of the poly(α-methyl styrene) oil of Example I to produce a hydrocarbon base containing about 70% of 1,1,3-trimethyl-3-cyclohexyl hydrindan.

Example III shows the preparation of a highly branched paraffin oil having a good traction coefficient and good VI, by hydrogenation of the oil obtained by thermal cracking of high molecular weight polyisobutylene.

Example IV shows the preparation of a branched paraffin oil by hydrogenation of poly-1,3-(3-methylbutene-1).

Example V shows the preparation of a branched paraffin oil by hydrogenation of a liquid polymer of 2,3-dimethylbutene-1.

Example VI illustrates the advantageous performance in a traction transmission of two novel traction fluids, in comparison with a conventional napthenic lube (oil 35) and a polybutene fluid prepared by polymerization of a mixed butylene stream (oil 23).

EXAMPLE I 466 g. of a commercial α-methyl styrene polymer, obtained by conventional acid-catalyzed polymerization, is placed in a one-liter round bottomed flask, attached to a one-inch column, and dry distilled with essentially no reflux or fractionation at a pot temperature of about 290° C., and a vapor temperature of about 210° C. under a vacuum of about 6 millimeters of mercury. 373 g. of distillate are obtained and about 73 grams of material remain in the bottom of the flask at the end of the distillation. The commercial α-methyl styrene polymer has a softening point of 210° F., a Gardner-Holdt viscosity of J–L, a specific gravity of 1.075, a refractive index at 20° C. of 1.61, a molecular weight of 685, an iodine number of 0, an acid number of 0, and a saponification number of 0.

EXAMPLE II 300 g. of the distillation product of Example I is placed in a 316 stainless steel bomb along with 7.5 grams of Raney nickel catalyst and the bomb is pressured to 3000 p.s.i.g. of 100% hydrogen while heat is applied until the temperature in the bomb is 150° C. At that point an exothermic reaction occurs and heating is discontinued. The temperature is allowed to rise to about 220° C. and the hydrogen pressure is maintained at 3000 p.s.i. for 6 hours at which time the bomb is slowly cooled to ambient temperature while maintaining the hydrogen pressure at 3000 p.s.i. in order to avoid dehydrogenation of the hydrogenated product. The resulting perhydrogenated poly (α-methyl styrene) oil is topped to remove components boiling below 125° C. The properties of the remaining perhydrogenated product are listed in Table II as oil 5. The traction coefficient of this fluid is determined in an apparatus similar to that of Rounds, F. G., J. C & E Data, 5, pp. 499–507 (1960), employing two steel thrust ball bearings and requiring 170 ml. of lubricant, by measuring the torque transmitted through the bearings as a function of load, speed, and oil temperature. The coefficients calculated from these measurements are reported in Table II herein. The fluid is also tested as a lubricant in a dynamometer mounted prototype transmission in which speeds of 2000–3000 ft./min. are used and in an actual automobile with a torque transmission. The performance in these tests proves that the oil is satisfactory as a traction fluid; however, the low temperature properties of this oil do not suit it for automotive use. Analysis by nuclear magnetic resonance (NMR) shows the oil of this example to contain about 20% of trimers (mostly hydrindan), about 10% of 2,5-(dicyclohexyl)-2-methyl pentane, and about 70% of 1,1,3-trimethyl - 3 - cyclohexyl hydrindan.

EXAMPLE III

A commercially available polyisobutylene polymer, having a molecular weight of 10,000, and having been prepared by low temperature polymerization with $AlCl_3$ catalyst, is thermally cracked as in Example I. About 50% of the polymer cracks to isobutylene and the remainder is hydrogenated using an 0.5% palladium on charcoal catalyst at 275° C. and 1500 p.s.i. of hydrogen for 8 hours. The resulting hydrogenated polyisobutylene oil has the properties shown in Table II for oil 34, and has a large NMR peak at 8.58τ and almost no NMR peak at 8.84–8.85τ.

EXAMPLE IV

A dry one-quart pop bottle is charged with 235 grams of dry, pure 3-methylbutene-1, 16 ml. of a 1 molar solution of $Al_2Et_3Cl_3$ in cyclohexane, and 14 ml. of a 1 molar solution of $TiCl_4$ in hexane. The reaction proceeds at 30° C. for 20 hours. The reaction mixture is then stirred with 5 ml. of concentrated ammonium hydroxide for one-half hour and the catalyst residue filtered from the product. Solvent is stripped from the product, by distillation and the resulting solvent-free oil is distilled at about 0.5 mm. Hg to remove products boiling below 150° C. 104 g. of an oily bottoms product was obtained, having a kinematic viscosity of 175 cs. at 210° F. The structure of the polymeric units is established by NMR analysis to be the 1,3-addition product rather than the expected 1,2-addition. That is, the product corresponds to poly-1,3-(3-methylbutene-1). It is cracked and hydrogenated as in Example III and the resulting oil fractionated. One of the fractions of this oil is shown in Table II as oil 31. Another method of making oils containing poly-3-methylbutene-1, which upon hydrogenation are useful as traction fluids or components of traction fluids, is shown in Belgian Pat. No. 663,549. Also useful is poly-2-methylbutene-1 (see U.S. 2,274,031) which upon hydrogenation makes a good component for a traction fluid.

EXAMPLE V 2,3-dimethylbutene-1 is contacted as in Example IV at 30° C. for 20 hours with a catalyst prepared from 1.17 moles of ethyl aluminum susquechloride and 1 mole of titanium tetrachloride. Unreacted monomer is removed, by distillation, from the catalyst-free reaction mixture to obtain 72% yield of an oil. This oil is hydrogenated as in Example III. The properties of the hydrogenated oil are shown in Table II, as oil 9.

The liquid polymers of 2,3-dimethylbutene-1 are valuable as traction fluids or as components of traction fluids, due to their thermal and oxidative stability as can be seen from inspection of the properties reported for oil 9 in Table II. Higher molecular weight polymers can be prepared from 2,3-dimethylbutene-1 using a cationic system, as with $BF_3$ catalyst, at low temperature (as −78° C.). For example, with $BF_3$ at −78° C. a yield of 13.5%, based on the olefin charged, is obtained of a high molecular weight polymer 2,3-dimethylbutene-1 which is optically clear, tough, and has a high molecular weight (intrinsic viscosity of 0.1 at 30° C. in cyclohexane). These high polymers are useful as additives for wax formulations in order to provide increased hardness and strength.

EXAMPLE VI

The oil (oil 5) of Example I is tested in a traction transmission similar to that of FIGS. 1 and 2. Similarly, oils 1, 23 and 35 of Tables I and II are also tested in this transmission. A comparison of the maximum torque which can be obtained without slippage with each of these four fluids in the transmission is shown in Table V below, along with the viscosity index and the coefficient of traction obtained in the laboratory test device at 500,000 p.s.i., 200° F., and 1000 ft./min. It can be seen that oil 1 possesses the best combination of traction properties and fluidity properties (e.g., the viscosity index). Oil 1 has only a 9% greater coefficient of traction in the laboratory device than oil 23 and yet is able to withstand 32% greater torque without slippage than oil 23. Note also that oil 5, containing about 20% of perhydrogenated α-methyl styrene trimers, has the best traction properties but has the lowest viscosity index of the four oils.

TABLE I

| Oil No. | Structure and/or how obtained |
|---|---|
| 1 | 50% Oil 6+50% Oil 34. Tg=−93° C. |
| 2 | Oil 1+4% polyacrylate VI improver+35 p.p.m. silicone anti-foam. |
| 3 | 5% Oil 40+95% Oil 6. |
| 4 | 30% Oil 6+70% Oil 34. Tg=−88.5° C. |
| 5 | Perhydrogenated α-methyl styrene dimerizate (PHAMSD), 10% DCHMP, 20% trimers (mostly hydrindan) 70% DMMCHH: |

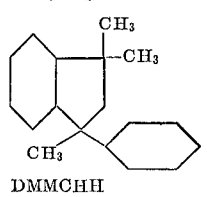
DMMCHH

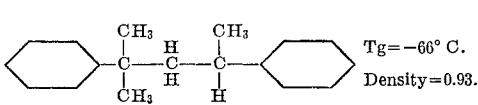
DCHMP

Tg=−66° C.
Density=0.93.

TABLE I.—Continued

| Oil No. | Structure and/or how obtained |
|---|---|
| 6 | Oil similar to Oil 5 but containing 15% of trimers. |
| 7 | Perhydrogenation of poly(4-methylpentene-1): |

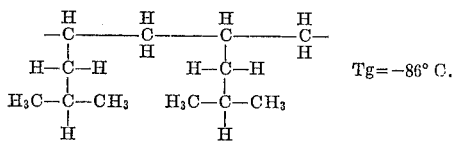  Tg=−86° C.

| 8 | 10% Oil 6+90% Oil 19. Tg=−95° C. |
| 9 | Perhydrogenated polymer of (2,3-dimethylbutene-1): |

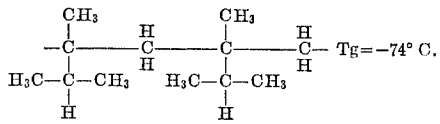  Tg=−74° C.

| 10 | 50% Oil 6+50% Oil 19. Tg=−81° C. |
| 11 | 50% tetraisopropyldecalin (TIPD)+50% oil 19. Tg=−78° C. |
| 12 | 50% Oil 22+50% Oil 34. |
| 13 | 50% Oil 6+50% Oil 19. Tg=−83° C. |
| 14 | Perhydrogenated α-methyl styrene dimerizate, Tg=−56° C. (30% DMMCHH, 30% DCHMP, 40% trimers with some tetramers). |
| 15 | Perhydrogenated styrene dimerizate (PHSD), av. mol. wt. 305 (15% hydrindan dimer and dicycloalkane dimer, 85% trimers with some tetramers). Boiling range 150–235° C./0.1 mm. Hg: |

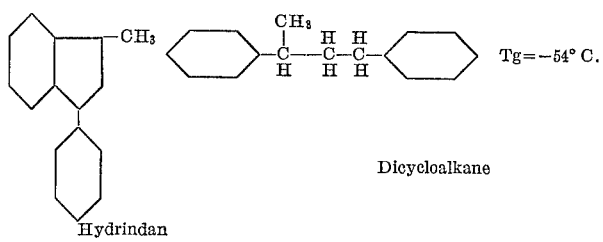  Tg=−54° C.

Hydrindan    Dicycloalkane

| 16 | Oil 6+½% 4,4'-tetramethyldiaminophenylmethane (antioxidant)+¼% N-phenyl-1-naphthalamine+1% tricresolphosphate (antiwear agent). |
| 17 | Tetraisopropyldecalin (TIPD): |

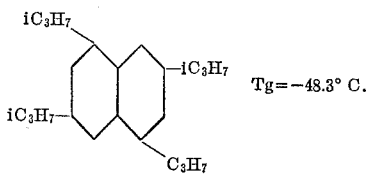  Tg=−48.3° C.

| 18 | 50% Oil 22+50% Oil 19. |
| 19 | Severe hydrogenation of Oil 23 (polybutene A): |

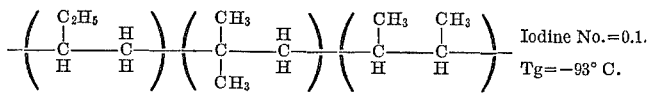  Iodine No.=0.1.  Tg=−93° C.

| 20 | 70% Oil 34+30% hydrogenated styrene trimer oil (15.9 cs. at 210° F.) containing less than 10% of tetramer and dimer. Blend Tg=−102° C. |
| 21 | 30% Oil 17+70% Oil 34. Tg=−88° C. |
| 22 | Severely hydrogenated naphthenic distillate (prepared by further hydrogenation of Oil 27). |
| 23 | Dumbbell blended cuts of acid polymerized, mixed butene stream followed by mild hydrotreatment (as in U.S. 3,100,808). Resulting oil has 290° F. flash point, boiling range 470° F.−1040+ (90%) and is about 40% gem configuration and has less than 5% of cyclic groups. Tg=−88° C., av. mol. wt. 375. |
| 24 | 15% of an oil having an ASTM-VI (D2270) of −508 and a KV of 34.75 cs. at 210° F. obtained by hydrogenation of a polymeric α-methyl styrene+85% of an oil having an ASTM-VI of 27, obtained by severe hydrogenation (to less than 1% aromatics) of a 110 SUS (at 100° F.) naphthenic distillate. |
| 25 | Narrow boiling fraction (215–285° C./0.2 mm. Hg, av. mol. wt. 496) of Oil 43. Tg=−84° C. |
| 26 | Perhydrogenation of Oil 40 to obtain hydimer oil containing 55% dimers having hydrindan and di(cycloalkane) structures and 45% trimers. Av. mol. wt. 247, boiling range 150–196° C./0.3 mm. Hg. Structures of the dimer portion of the oil are: |

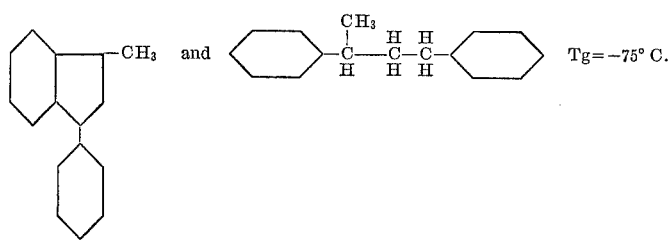  Tg=−75° C.

| 27 | Further hydrogenation of Oil 36 and removal of residual aromatics by silica gel adsorption. |
| 28 | 30% Oil 34+70% 2.94 cs. (at 210° C.) oil similar to Oil 26 but containing 40% trimers. Tg=−85° C. |
| 29 | 50% Oil 34+50% 8 cs. (at 210° F.) hydrogenated polystyrene oil similar to Oil 15 and containing 80% trimers (some tetramers) and 20% dimers. Tg=−94° C. |
| 30 | Hydrogenation of Oil 35 to C$_A$=2% (sulfided Ni/Mo oxide catalyst, 0.5 LHSV of fresh feed/3.5 recycle LHSV, 650° F., 1,000 p.s.i. H$_2$), Iodine No. 15.3. Tg=−79° C. |
| 31 | Hydrogenation of polymerized 3-methylbutene-1: |

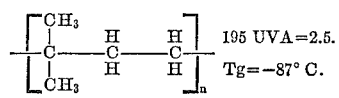  195 UVA=2.5.  Tg=−87° C.

TABLE I.—Continued

| Oil No. | Structure and/or how obtained |
|---|---|
| 32 | 1,3-(5,7-dimethyl)adamantyl dipelargonate (DMAP): 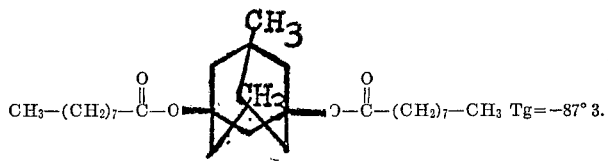 $CH_3—(CH_2)_7—\overset{O}{\underset{\|}{C}}—O—[adamantyl]—O—\overset{O}{\underset{\|}{C}}—(CH_2)_7—CH_3$  Tg=−87° 3. |
| 33 | Hydrogenation (to 30% gel aromatics) of 90% gel aromatics extract from furfural extraction of 150 SUS naphthenic distillate. Tg=−63.5° C. |
| 34 | Hydrogenation of cracked polyisobutylene, resulting hydrogenated oil has a large NMR peak at 8.58 tau and no appreciable peak at 8.84–8.85 tau. Initial boiling point=650° F., 90% point=990° F.: 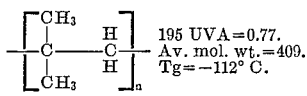 195 UVA=0.77. Av. mol. wt.=409. Tg=−112° C. |
| 35 | ASTM Oil No. 3 (naphthenic lube), Iodine No. 25.1, 43% gel aromatics, 21% $C_A$. Tg=−77° C. |
| 36 | Hydrogenation (0.5 LHSV fresh feed, 3.5 recycle LHSV, 650° F., 1,000 p.s.i. $H_2$, Ni-Mo) of 300 SUS at 100° F. naphthenic distillate obtained by process of U.S. 3,184,396. |
| 37 | Hydrogenated polypropylene—narrow boiling (195–260° C./0.2 mm. Hg) fraction of Oil 45. 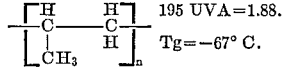 195 UVA=1.88. Tg=−67° C. |
| 38 | Further hydrogenation of Oil 37, 195 UVA=0.00, Tg=−64° C. |
| 39 | Hydrogenation of poly(1-hexene): 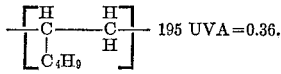 195 UVA=0.36. |
| 40 | Acid polymerized styrene, 55% dimers and 45% trimers. Tg=−48° C. |
| 41 | Hydrogenation of copolymer of 51 moles propylene and 49 moles butene-1: 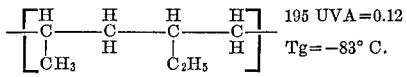 195 UVA=0.12  Tg=−83° C. |
| 42 | 40% Oil 26+60% Oil 38. Tg=−80° C. |
| 43 | Boiling range 152–300+° C./0.2 mm. Hg, hydrogenated polymer (Ziegler catalyst) of butene-1: 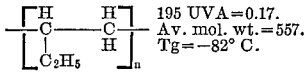 195 UVA=0.17. Av. mol. wt.=557. Tg=−82° C. |
| 44 | Hydrogenated copolymer (as in U.S. 2,327,705) of 56 mole percent ethylene with 44% propylene, 195 UVA=0.00, Tg=−96° C. |
| 45 | Hydrogenated polymer of propylene (wide boiling fraction): 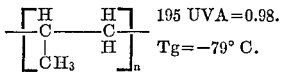 195 UVA=0.98. Tg=−79° C. |
| 46 | Hydrogenated polymer of octene-1. |
| 47 | Hydrogenation of a commercially available polybutylene having Iodine No. of 48, $KV_{210}$=3.25 (oil cracked slightly during hydrogenation). |
| 48 | Hydrogenated polymer of pentene-1. Tg=−106° C. |
| 49 | 50% Oil 6+50% Oil 22. |
| 50 | 55 SUS (at 100° F.) naphthenic distillate containing 40% gel aromatics was severely hydrogenated to less than 0.4% aromatics. These residual aromatics were then removed by silica gel adsorption to obtain an oil having a 260 UVA of 0.00. |
| 51 | 50% Oil 50+50% Oil 6. |
| 52 | Oil 36+0.5% N-phenyl-1-naphthylamine, 0.5% 4,4'-tetramethyldiamino-diphenylmethane, 1% tricresylphosphate (to increase traction coefficient). |
| 53 | Hydrogenated dimer oil (boiling range 195–250° C./1 mm. Hg) obtained by distillation from product of reaction at 125° C. for ½ hr. of formaldehyde and catalytic gas oil (B.R. 425–625° F.), 1 mole formaldehyde per 2 moles of aromatics, with equal weight based on formaldehyde of catalyst, containing 3 moles of acetic acid and 1 mole of sulfuric acid. |

TABLE II

| | Coefficient of traction | | | | | | KV, 210° F. | Viscosity index | | Pour point (° F.) | 260 UVA | Used oil, percent increase | |
|---|---|---|---|---|---|---|---|---|---|---|---|---|---|
| | 100 ft./m. | | | | | 600 ft./m. | | | | | | | |
| Oil No. | 300,000* 200° F. | 400,000* 100° F. | 400,000* 200° F. | 400,000* 300° F. | 500,000* 200° F. | 400,000* 200° F. | | ASTM | VTF | | | $KV_{100}$ | TAN |
| 1 | 0.033 | 0.056 | 0.055 | 0.044 | 0.049 | 0.059 | 6.69 | 62 | 57 | −35 | 0.003 | | |
| 2 | 0.029 | 0.055 | 0.054 | 0.045 | 0.049 | 0.058 | 9.09 | 122 | 111 | −35 | 0.003 | 12 | 0 |
| 3 | 0.027 | 0.059 | 0.054 | 0.050 | 0.050 | 0.057 | 4.28 | −45 | 12 | −10 | | 3.7 | 0.17 |
| 4 | 0.030 | 0.059 | 0.0535 | 0.049 | (0.055) | 0.059 | 4.50 | 41 | 54 | −35 | 0.022 | 18.3 | 0.23 |
| 5 | 0.030 | 0.052 | 0.053 | 0.048 | 0.049 | 0.056 | 5.50 | −46 | −9 | −5 | 0.003 | 2.3 | 0 |
| 6 | 0.026 | 0.059 | 0.053 | 0.049 | 0.045 | 0.055 | 4.49 | −42 | 10 | −5 | | 3.0 | 0.11 |
| 7 | 0.024 | 0.054 | 0.052 | 0.040 | 0.041 | 0.055 | 4.80 | 19 | 37 | −50 | | 15.1 | 0 |
| 8 | 0.024 | 0.053 | 0.052 | 0.048 | 0.047 | 0.056 | 4.29 | 48.5 | 60 | −30 | | 36.2 | 0.06 |
| 9 | 0.029 | 0.052 | 0.051 | 0.046 | (0.053) | 0.056 | 7.98 | −16 | 2 | +10 | 0.055 | 2.8 | 0.00 |
| 10 | 0.025 | 0.054 | 0.051 | 0.041 | 0.048 | 0.055 | 4.40 | 28 | 48 | −50 | | 11.9 | 0 |
| 11 | 0.027 | 0.052 | 0.050 | 0.052 | 0.048 | 0.054 | 4.93 | −88 | −20 | | | 32.1 | 0.06 |
| 12 | 0.033 | 0.050 | 0.050 | 0.046 | (0.054) | 0.056 | 4.95 | 76 | 72 | −45 | 0.024 | 0.09 | 0.23 |
| 13 | 0.019 | 0.051 | 0.050 | 0.046 | (0.055) | 0.056 | 4.55 | 28 | 46 | −30 | 0.022 | 15.9 | 0.17 |
| 14 | 0.026 | 0.054 | 0.050 | 0.044 | 0.050 | 0.058 | 8.02 | −100 | −38 | +15 | 0.003 | | |
| 15 | 0.034 | 0.053 | 0.049 | 0.047 | 0.052 | 0.049 | 8.21 | −141 | −43 | +5 | 0.02 | 2.7 | 0 |
| 16 | 0.028 | 0.052 | 0.049 | 0.042 | 0.047 | 0.054 | 9.30 | 00 | 89.5 | −5 | 0.003 | 3.3 | 0 |
| 17 | 0.024 | 0.049 | 0.048 | 0.040 | 0.044 | 0.052 | 6.54 | −465 | −150 | +10 | 0.01 | −2.3 | 0 |
| 18 | 0.021 | 0.050 | 0.048 | 0.041 | 0.043 | 0.052 | 4.32 | 36 | 52 | −30 | | | |
| 19 | 0.027 | 0.050 | 0.047 | 0.041 | 0.042 | 0.053 | 5.20 | 74 | 68 | −50 | | 54.7 | 0 |
| 20 | 0.022 | 0.049 | 0.046 | 0.041 | 0.048 | 0.056 | 5.17 | 61 | 58 | −30 | 0.027 | 10.8 | 0 |

TABLE II.—Continued

| | Coefficient of traction | | | | | | | Viscosity index | | Pour point (° F.) | Used oil, percent increase | | |
|---|---|---|---|---|---|---|---|---|---|---|---|---|---|
| | 100 ft./m. | | | | | 600 ft./m. | KV 210° F. | | | | 260 UVA | | |
| Oil No. | 300,000* 200° F. | 400,000* 100° F. | 400,000* 200° F. | 400,000* 300° F. | 500,000* 200° F. | 400,000* 200° F. | | ASTM | VTF | | | KV$_{100}$ | TAN |
| 21 | 0.021 | 0.047 | 0.045 | 0.046 | 0.045 | 0.048 | 4.62 | −15 | 22 | | | 51.1 | 0.22 |
| 22 | 0.026 | 0.047 | 0.045 | 0.043 | 0.047 | 0.050 | 4.31 | 24 | 40 | −55 | 0.000 | 1.6 | 0.23 |
| 23 | 0.021 | 0.048 | 0.045 | 0.039 | 0.044 | 0.050 | 4.92 | 53 | 66 | −60 | 0.31 | | 0 |
| 24 | 0.025 | 0.049 | 0.045 | 0.037 | 0.043 | 0.051 | 4.32 | 12 | 41 | −25 | 0.001 | 2.1 | 0.6 |
| 25 | 0.022 | 0.044 | 0.044 | 0.035 | 0.039 | 0.045 | 7.29 | 69 | 63 | −35 | 0.01 | 5.8 | 1.0 |
| 26 | 0.021 | 0.048 | 0.043 | 0.039 | 0.047 | 0.052 | 3.30 | −18 | 22 | −30 | 0.027 | 2.5 | 0 |
| 27 | 0.022 | 0.051 | 0.043 | 0.037 | 0.043 | 0.048 | 4.56 | 26 | 45 | −40 | 0.000 | 1.0 | 0.6 |
| 28 | 0.020 | 0.048 | 0.043 | 0.037 | 0.047 | 0.050 | 4.38 | 40 | 54 | −30 | 0.027 | −1.0 | 0 |
| 29 | 0.021 | 0.050 | 0.043 | 0.038 | 0.048 | 0.055 | 5.27 | 52 | 52 | −30 | 0.027 | −2.2 | 0 |
| 30 | 0.019 | 0.046 | 0.042 | 0.037 | 0.042 | 0.045 | 4.66 | 22 | 50 | −35 | 0.054 | 2.8 | 0.4 |
| 31 | 0.021 | 0.047 | 0.041 | 0.039 | 0.046 | 0.045 | 5.47 | 31 | 36 | −25 | 0.5 | 9.5 | 0 |
| 32 | 0.023 | 0.044 | 0.041 | 0.035 | 0.041 | 0.044 | 7.0 | 95 | 85 | −70 | 0 | 2.4 | 1.85 |
| 33 | 0.019 | 0.041 | 0.041 | 0.035 | 0.038 | 0.044 | 5.13 | −77 | −20 | −10 | 1.0 | 15.5 | 0 |
| 34 | 0.018 | 0.047 | 0.040 | 0.033 | 0.043 | 0.044 | 8.12 | 106 | 98 | <−60 | 0.07 | 4.6 | 0.6 |
| 35 | 0.016 | 0.040 | 0.037 | 0.035 | 0.042 | 0.042 | 4.41 | −11 | 26 | −30 | | | |
| 36 | 0.010 | 0.038 | 0.036 | 0.027 | 0.038 | 0.039 | 4.64 | 2 | 10 | −25 | 0.5 | 2.7 | 0.012 |
| 37 | 0.010 | 0.039 | 0.035 | 0.031 | 0.040 | 0.039 | 5.68 | 67 | 60 | −30 | 0.05 | −0.9 | 0.1 |
| 38 | 0.017 | 0.042 | 0.035 | 0.030 | 0.036 | 0.039 | 9.27 | 7 | 64 | −25 | 0 | | 0.8 |
| 39 | 0.12 | 0.034 | 0.034 | 0.029 | 0.033 | 0.036 | 7.40 | 110 | 101 | −70 | 0.01 | 20.6 | .2.8 |
| 40 | 0.002 | 0.037 | 0.032 | 0.029 | 0.037 | 0.034 | 5.32 | −241 | −86 | +15 | | 6.9 | 0.1 |
| 41 | 0.008 | 0.034 | 0.032 | 0.031 | 0.031 | 0.036 | 6.18 | 82 | 73 | −25 | 0.01 | 3.1 | 0.1 |
| 42 | | 0.038 | 0.031 | 0.029 | 0.039 | 0.037 | 4.24 | 12 | 38 | | 0.13 | 9.6 | 0.1 |
| 43 | 0.004 | 0.036 | 0.031 | 0.029 | 0.036 | 0.033 | 10.38 | 71 | 65 | | 0.015 | 4.2 | 0.1 |
| 44 | 0.014 | 0.037 | 0.030 | 0.026 | 0.026 | 0.035 | 8.50 | 153 | 131 | −15 | 0 | | |
| 45 | 0.010 | 0.041 | 0.029 | 0.023 | 0.033 | 0.031 | 4.49 | 80 | 78 | −20 | 0.06 | 5.5 | 0.1 |
| 46 | 0.009 | 0.032 | 0.024 | 0.023 | 0.029 | 0.030 | | ≈140 | ≈150 | <−50 | | | |
| 47 | 0.038 | 0.046 | 0.045 | 0.037 | 0.048 | | 2.84 | 78 | 86 | −60 | | 45.6 | 0.12 |
| 48 | | | | | 0.032 | | 3.67 | 93 | 93 | | | | |
| 49 | 0.024 | 0.051 | 0.048 | 0.040 | 0.046 | | 4.38 | 1 | 33 | | | | |
| 50 | 0.021 | 0.050 | 0.050 | 0.043 | 0.044 | | 2.24 | 55 | 61 | | | | |
| 51 | 0.021 | 0.053 | 0.053 | 0.048 | 0.047 | | 2.87 | 31 | 48 | | | | |
| 52 | 0.013 | 0.043 | 0.037 | 0.027 | 0.038 | | 4.64 | 2 | 10 | −25 | | −0.4 | 0.12 |
| 53 | 0.024 | 0.045 | 0.043 | 0.039 | 0.045 | | 6.27 | −38 | 6 | +35 | | −0.4 | 0 |

*Pounds per square inch.

TABLE III

| Oil | Average traction coefficient, 1,000 ft./min.[1] | Percent[2] of DMAP | VTF-VI | KV$_{210}$ | KV$_{100}$ | Pour point, ° F. | Tg, ° C. | Composition |
|---|---|---|---|---|---|---|---|---|
| A | 0.051 | 38 | 50 | 7.6 | 76.7 | −25 | −105 | 70% Oil 34+30% hydrindan trimer of α-methyl styrene. |
| B | 0.050 | 35 | −46 | 4.3 | 44.5 | 10 | −57 | Perhydro-ortho-terphenyl (pure). |
| C | 0.049 | 32 | −36 | 4.2 | 40.5 | | −59 | Perhydro-ortho-terphenyl (impure—contains some other perhydroterphenyls). |
| D | 0.047 | 27 | 49 | 4.4 | 29.6 | −20 | −89 | 70% Oil 34+30% Oil F. |
| E | 0.047 | 27 | 77 | 4.2 | 23.8 | | −105 | 70% Oil 34+30% Oil B. |
| F | 0.046 | 24 | 10 | 4.5 | 37.4 | −5 | −68 | Perhydrogenated dimerizate of A-methyl styrene, 15% trimers, 251 av. mol. wt. |
| G | 0.045 | 22 | −66 | 5.7 | 90.3 | −5 | −66 | 30% Oil S+70% TIPD (Oil 17). |
| H | 0.044 | 19 | 38 | 4.7 | 34.6 | | −86 | 1,3-(5,7-dimethyl) adamantyl dicaproate (DMAC) (density 1.009). |
| I | 0.044 | 19 | 42 | 4.0 | 22.5 | −50 | −89 | 50% Oil F/50% severely hydrogenated solvent-refined lube (215 aniline point, 1.472 R.I., 40.6 SUS at 210° F., 114.1 SUS at 100° F.). |
| J | 0.044 | 19 | 83 | 4.3 | 24.6 | −25 | −112 | 50% Oil 34+50% Oil S. |
| K | 0.043 | 16 | 70 | 5.6 | 40.0 | −45 | −106 | 50% Oil 34+50% Oil G. |
| L | 0.043 | 16 | 23 | 4.1 | 29.1 | | −79 | 50% Oil S+50% Oil B. |
| M | 0.042 | 14 | 56 | 4.3 | 27.6 | | −89 | 90% Oil S+10% Oil B. |
| N | 0.042 | 14 | 58 | 3.5 | 19.0 | −35 | −90 | 55% Oil F+45% commercial polybutene oil. |
| O | 0.042 | 14 | 79 | 4.0 | 21.8 | | −95 | Equal weights of Oil F, Oil S and 46. |
| P | 0.040 | 8 | 43 | 4.2 | 27.6 | | −87 | 70% Oil S+30% Oil B. |
| Q | 0.040 | 8 | 60 | 4.4 | 28.2 | | −95 | 50% Oil S+10% Perhydrogenated p-terphenyl. |
| R | 0.040 | 8 | −64 | 5.6 | 84.0 | 0 | −54 | Perhydrogenated, 9-benzylidene fluorene. |
| S | 0.039 | 5 | 64 | 4.6 | 29.6 | | −96 | Oil similar to Oil 19. |
| T | 0.039 | 5 | 42 | 5.4 | 44.8 | | −88 | 50% Oil S+50% Oil G. |
| U | 0.038 | 3 | 107 | 1.7 | 5.2 | | −119 | Cyclopentyl dimethyladamantane. |
| V | 0.038 | 3 | 105 | 4.1 | 20.3 | | −122 | 75% Oil 34+25% Oil. |
| W | 0.037 | 0 | 80 | 7.0 | 55.5 | −70 | −89 | DMAP (See Oil 32 Table II). |
| X | 0.035 | −5 | 92 | 4.0 | 20.7 | | −107 | 50% Oil S+50% Oil 46. |
| Y | 0.035 | −5 | 83 | 3.9 | 20.9 | | −97 | 50% Oil F+50% Oil 46. |
| Z | 0.035 | −5 | 133 | 1.7 | 5.0 | | −101 | Perhydrophenanthrene. |
| AA | 0.035 | −5 | 50 | 4.3 | 28.2 | | −57 | 90% Oil S+10% Oil 17 (TIPD). |
| AB | 0.034 | −8 | 26 | 4.4 | 33.4 | −35 | −77 | Oil 35 (ASTM Oil No. 3). |
| AC | 0.031 | −16 | 110 | 1.55 | 4.42 | | −52 | Ethyl adamantane, boiling point 224° C. |
| AD | 0.029 | −22 | 62 | 1.16 | 2.89 | | −26 | Dimethyladamantane, boiling point 204° C., melting point −26° C. |

[1] Arithmatic mean of traction coefficients at 1,000 ft./min. (speed of rolling contact) and 300,000 p.s.i./200° F., 400,000 p.s.i./100° F., 400,000 p.s.i./200° F., 400,000 p.s.i./300° F. and 500,000 p.s.i./200° F.
[2] Percent increase (or decrease) of average traction coefficient compared to that of DMAP (Oil W).

NOTE.—All percentages are by volume unless otherwise noted; however, since the densities of most of the component oils of the above blends are quite close (± 10%), percent by volume and percent by weight are about the same.

TABLE IV

| Oil No. | ASTM-VI | Laboratory traction coefficient | Maximum torque without slippage, ft.-lbs. |
|---|---|---|---|
| 35 (Naphthenic lube) | −11 | 0.042 | 90 |
| 23 (Poly-mixed butenes) | 53 | 0.044 | 103 |
| 1 (Naphthene-paraffin blend) | 62 | 0.0485 | 136 |
| 5 (Hydrogenated α-methyl styrene dimer) | −46 | 0.049 | 144 |

The performance of oil 1 in the traction transmission is satisfactory for automotive use. However, the properties of oil A in Table III indicate that it will allow the traction transmission to operate at an even higher torque withslippage than any of the four oils on this table.

We claim:

1. A hydrocarbon base stock, useful for lubrication of a traction drive transmission, said base stock having a kinematic viscosity at 210° F. in the range of 1.5–200.0 cs. and consisting essentially of at least one naphthene and at least one acyclic hydrocarbon and wherein said naphthene is at least one perhydrogenated homopolymer, copolymer, or terpolymer of any of the following monomers:

(1) styrene
(2) α-methyl styrene,
(3) β-methyl styrene, and
(4) monomers of (1), (2) or (3) having one or two methyl groups attached to the ring;

and wherein said acyclic hydrocarbon is at least one member from at least one of the following groups:

(i) a homopolymer, copolymer or terpolymer of $C_3$–$C_8$ olefin; or
(ii) a member from group (i) above which has been at least partially hydrogenated;

and wherein said blend has a greater coefficient of traction, measured at 600 ft./min., 200° F., 400,000 p.s.i., than that of ASTM oil No. 3.

2. A hydrocarbon base stock according to claim 1 wherein said hydrocarbon base stock boils mainly above 500° F. and has an ultraviolet absorptivity below 0.5 at 260 millimicrons and wherein said perhydrogenated homopolymer, copolymer, or terpolymer contains from 5–50 percent of a $C_{16}$–$C_{29}$ di(cyclohexyl)alkane having the formula

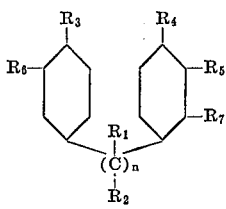

wherein $n$ is 1 to 3, $R_1$ and $R_2$ are hydrogen or methyl, and $R_3$, $R_4$, $R_5$, $R_6$, and $R_7$ are hydrogen, methyl, ethyl, or isopropyl.

3. A hydrocarbon base stock according to claim 2 wherein said base stock contains said di(cyclohexyl) alkane and from 0.1–20 parts by weight, based on said di(cyclohexyl) alkane, of a liquid homopolymer, copolymer, or terpolymer of $C_4$–$C_7$ olefin.

4. The hydrocarbon base stock of claim 3 wherein said olefin homopolymer, copolymer or terpolymer is at least partially hydrogenated.

5. A hydrocarbon base stock according to claim 1 wherein said hydrocarbon base stock boils mainly above 500° F. and has a 260 UVA below 0.5 and wherein said perhydrogenated homopolymer, copolymer, or terpolymer is a $C_{16}$–$C_{22}$ hydrindan having the structure

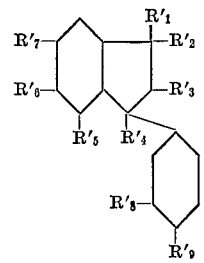

wherein $R'_1$ is methyl or ethyl, and $R'_2$, $R'_3$, $R'_4$, $R'_5$, $R'_6$, $R'_7$, $R'_8$ and $R'_9$ are hydrogen or methyl, said hydrindan being present in an amount of at least 10 percent by weight of the base stock.

6. A hydrocarbon base stock according to claim 5 wherein said base stock comprises said substituted hydrindan and from 0.1–20 parts by weight, based on said hydrindan, of a liquid homopolymer, copolymer, or terpolymer of $C_4$–$C_7$ olefin.

7. A hydrocarbon base stock according to claim 6 wherein said olefin is at least one member of the group consisting of isobutylene, 3-methylbutene-1, 4-methylpentene-1, or 2,3-dimethylbutene-1.

8. A hydrocarbon base stock according to claim 7 wherein at least 33% of the repeating groups of said olefin polymer have the structure

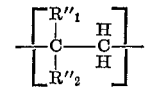

wherein $R''_1$ is hydrogen or methyl, and when $R''_1$ is hydrogen, $R''_2$ is isopropyl or isobutyl, and when $R''_1$ is methyl, $R''_2$ is methyl, ethyl, isopropyl, or isobutyl.

9. A hydrocarbon base stock according to claim 8 wherein said olefin polymer has an average molecular weight from 170–1000 and wherein at least 90% of the repeating units of said polymer have the structure

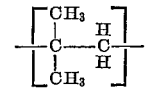

10. A hydrocarbon base stock according to claim 9 wherein said hydrindan consists of isomers of 1-methyl, 3-cyclohexyl hydrindan, or 1,1-dimethyl, 3-methyl, 3-cyclohexyl hydrindan or mixtures thereof.

11. A hydrocarbon base stock according to claim 1 wherein said composition contains from 40–95 percent of isomers of 1,1,3-trimethyl, 3-cyclohexyl hydrindan.

12. A hydrocarbon base stock according to claim 1 wherein said composition contains from 40–95 percent of isomers of 1-ethyl, 2-methyl, 3-cyclohexylhydrindan.

13. A hydrocarbon base stock according to claim 1 wherein said composition contains at least 5% of a perhydrogenated trimer of any of the said styrene monomers.

14. A hydrocarbon base stock according to claim 13 wherein said perhydrogenated trimer contains from 25–100% of a $C_{24}$–$C_{32}$ hydrindan having the structure

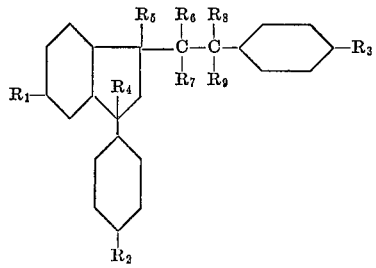

wherein $R_1$–$R_9$ are selected from hydrogen, methyl, ethyl and isopropyl.

15. A hydrocarbon base stock according to claim 13 wherein said base stock comprises said hydrindan and from 0.1–20 parts by weight, based on said hydrindan of a homopolymer, copolymer, or terpolymer of $C_3$–$C_8$ olefin.

16. A hydrocarbon base stock useful as a lubricant consisting essentially of at least one isomer of 1-methyl-3-cyclohexyl hydrindan or 1 - dimethyl-3-methyl-3-cyclohexyl hydrindan and from 0.1–10 parts by weight, based on said hydrindan, of at least one synthetic liquid $C_4$, $C_5$ or $C_6$ olefin homopolymer, copolymer, or terpolymer.

17. A hydrocarbon base stock according to claim 16 boiling mainly above 450° C. and wherein at least 33% of the repeating units of said olefin homopolymer, copolymer, or terpolymer have the structure

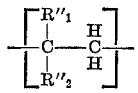

wherein $R''_1$ is hydrogen or methyl, and when $R''_1$ is hydrogen, $R''_2$ is isopropyl or isobutyl, and when $R''_1$ is methyl, $R''_2$ is methyl, ethyl, isopropyl, or isobutyl.

18. A hydrocarbon base stock according to claim 16 having a viscosity in the range of 1.8 to 20.0 cs. at 210° F., having an ASTM viscosity index greater than 40, and having a traction coefficient greater than that of ASTM Oil No. 3 at 600 ft./min., 200° F., and 400,000 p.s.i. and wherein from 8–40% by weight of said base stock is said hydrindan.

19. A base stock according to claim 18 wherein at least 33% of the repeating units of said olefin homopolymer, copolymer, or terpolymer have the structure

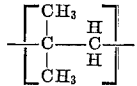

20. A hydrocarbon base stock useful as a lubricant and consisting essentially of at least 5% of a perhydrogenated trimer of any of the following monomers: (1) styrene, (2) α-methyl styrene, (3) β-methyl styrene, and (4) monomers (1), (2), or (3) having one or two methyl substituents attached to the ring, and from 0.1–20 parts by weight, based on said perhydrogenated trimer, of at least one synthetic liquid $C_3$–$C_8$ olefin homopolymer, copolymer, or terpolymer.

References Cited

UNITED STATES PATENTS

| | | | |
|---|---|---|---|
| 2,789,091 | 4/1957 | Crookshank et al. | 252—42 |
| 3,203,186 | 8/1965 | Sheppard | 60—54.5 |
| 3,208,946 | 9/1965 | Anderson et al. | 252—59 |
| 3,285,851 | 11/1966 | Dyer | 252—32.5 |
| 3,425,932 | 2/1969 | Surrena et al. | 208—143 |

LEON D. ROSDOL, Primary Examiner

D. SILVERSTEIN, Assistant Examiner

U.S. Cl. X.R.

74—200